(12) United States Patent
Ohtorii

(10) Patent No.: US 7,366,375 B2
(45) Date of Patent: Apr. 29, 2008

(54) OPTICAL WAVEGUIDE DEVICE, MANUFACTURING METHOD THEREOF, OPTICAL INFORMATION PROCESSING APPARATUS, AND ELECTRONIC EQUIPMENT

(75) Inventor: Hiizu Ohtorii, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/293,609

(22) Filed: Dec. 2, 2005

(65) Prior Publication Data
US 2006/0120666 A1 Jun. 8, 2006

(30) Foreign Application Priority Data
Dec. 6, 2004 (JP) ............................ P2004-352678

(51) Int. Cl.
G02B 6/32 (2006.01)
(52) U.S. Cl. ........................ 385/33; 385/129; 385/130; 385/131; 385/132; 385/14

(58) Field of Classification Search ........ 385/129–132, 385/2–3, 40–44, 14; 356/3.02; 65/386
See application file for complete search history.

(56) References Cited

U.S. PATENT DOCUMENTS

| | | | | |
|---|---|---|---|---|
| 5,659,648 | A * | 8/1997 | Knapp et al. | 385/129 |
| 6,810,160 | B2 * | 10/2004 | Sugama et al. | 385/14 |
| 2003/0123044 | A1 * | 7/2003 | Oka | 356/3.02 |
| 2003/0179978 | A1 * | 9/2003 | Iwasaki | 385/14 |
| 2007/0062221 | A1 * | 3/2007 | Ishida et al. | 65/386 |

* cited by examiner

Primary Examiner—Frank G. Font
Assistant Examiner—Guy G Anderson
(74) Attorney, Agent, or Firm—Sonnenschein Nath & Rosenthal LLP

(57) ABSTRACT

Disclosed herein is an optical waveguide device including a cladding having first and second surfaces opposite to each other, a core laminated to the first surface of the cladding for guiding light in a longitudinal direction thereof, the core having a pair of light incident and emergent portions at the opposite ends, and a pair of light collimating or focusing members bonded to the second surface of the cladding at the opposite ends corresponding to the light incident and emergent portions of the core.

20 Claims, 20 Drawing Sheets

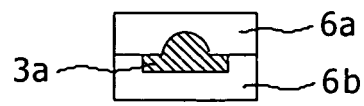
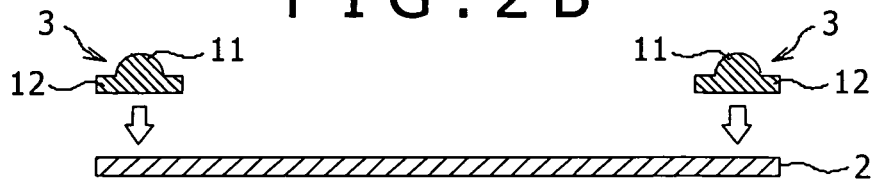
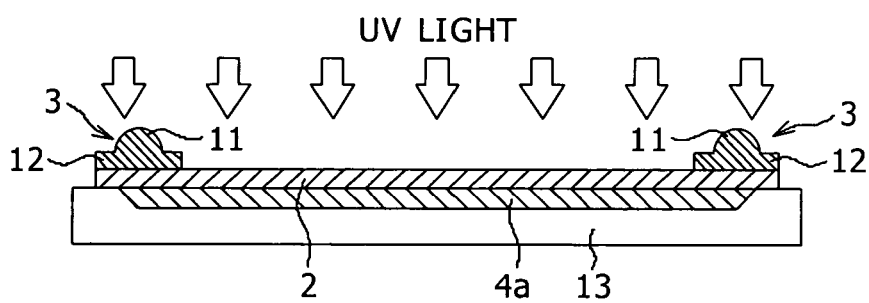
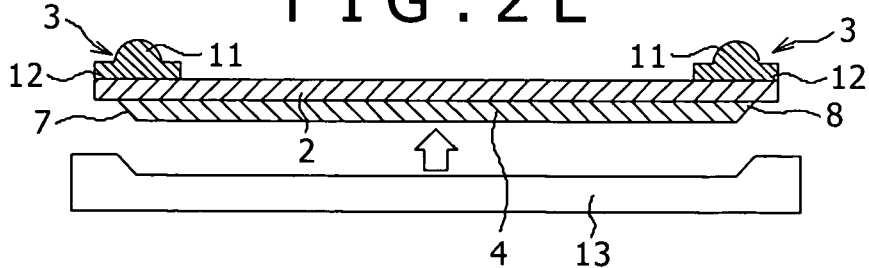
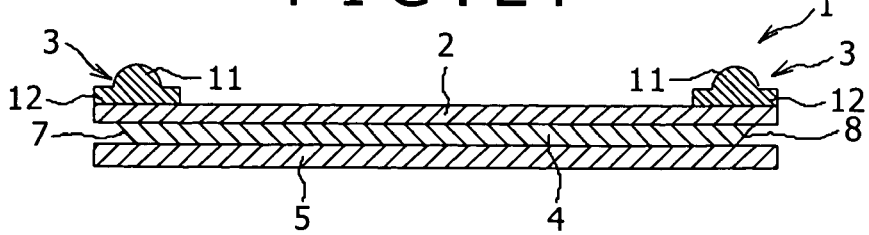

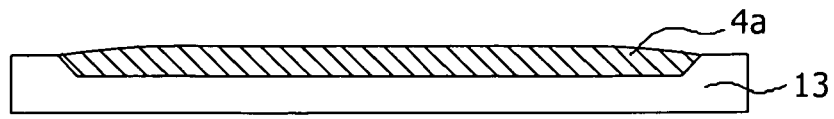
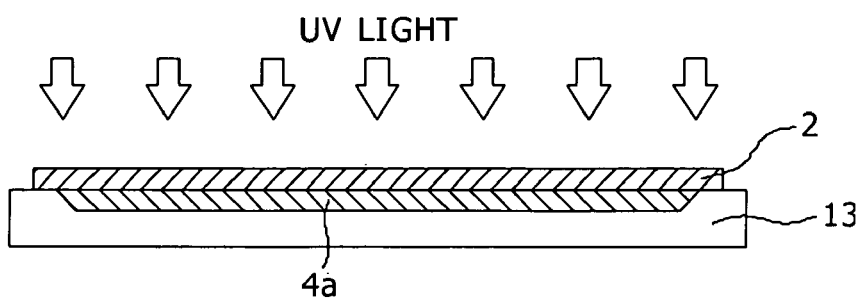
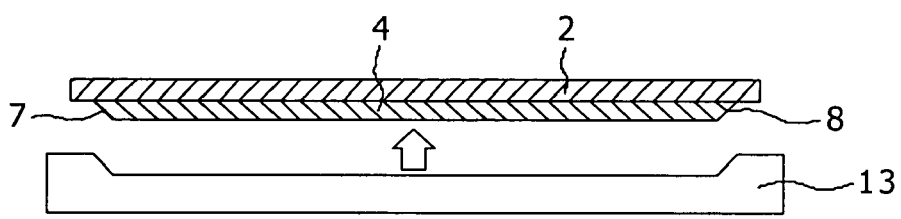
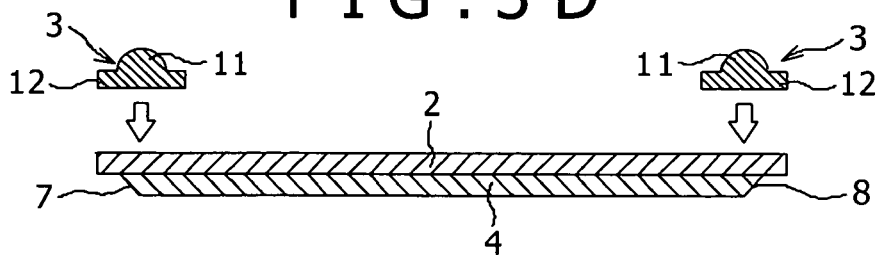
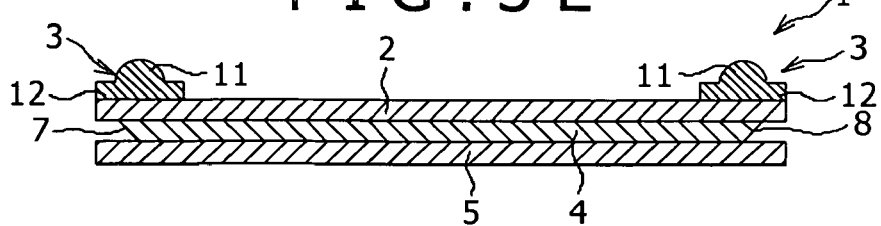

UV LIGHT

OPTICAL WAVEGUIDE DEVICE, MANUFACTURING METHOD THEREOF, OPTICAL INFORMATION PROCESSING APPARATUS, AND ELECTRONIC EQUIPMENT

CROSS REFERENCES TO RELATED APPLICATIONS

The present invention contains subject matter related to Japanese Patent Application JP 2004-352678 filed in the Japanese Patent Office on Dec. 6, 2004, the entire contents of which being incorporated herein by reference.

BACKGROUND OF THE INVENTION

The present invention relates to an optical waveguide device suitable for a light source module, optical interconnection, optical communication, etc., and also to a manufacturing method for the optical waveguide device, an optical information processing device using the optical waveguide device, and electronic equipment using the optical information processing apparatus.

At present, signal transmission between semiconductor chips such as LSIs (large-scale integrated circuits) is generally made by electrical signals through board wiring. However, a data exchange amount required between the chips has remarkably increased with a recent higher functionality of MPU, resulting in the occurrence of various high-frequency problems. Such high-frequency problems typically include RC signal delay, impedance mismatch, EMC/EMI, and crosstalk.

To solve these problems, a packaging industry has mainly attempted to use various techniques such as optimization of wiring and placement and development of new materials.

However, the effects by the optimization of wiring and placement and the development of new materials have been blocked by physical limitations in recent years. Accordingly, for realization of higher functionality of a system in the future, it has now become necessary to reconsider the structure of a printed wiring board designed to simply package semiconductor chips. In recent years, various drastic measures against these problems have been proposed. Typical ones of the drastic measures are as follows:

(1) Finer Interconnection by Formation of a Multichip Module (MCM)

A high-performance chip is mounted on a precise mounting board such as a ceramic/silicon board, thereby realizing finer interconnection that cannot be formed on a motherboard (multilayer printed board). Accordingly, a wiring pitch can be reduced and a data exchange amount can therefore be greatly increased by increasing a bus width.

(2) Electrical Interconnection by Sealing and Integration of Various Semiconductor Chips Various semiconductor chips are two-dimensionally sealed and integrated by using polyimide resin, and finer interconnection is made on such an integrated board. Accordingly, a wiring pitch can be reduced and a data exchange amount can therefore be greatly increased by increasing a bus width.

(3) Three-Dimensional Interconnection Between Semiconductor Chips

Through electrodes are formed in various semiconductor chips, and these semiconductor chips are attached together to form a multilayer structure. Accordingly, the interconnection between different kinds of semiconductor chips can be physically short-circuited, so that the problems including signal delay can be avoided. However, there arise other problems such as increased heating value due to the multilayering and thermal stress between the semiconductor chips.

Further, an optical transmission and coupling technique by optical wiring has been developed to realize high-speed and large-capacity signal exchange (e.g., "An Encounter with Optical Wiring", Nikkei Electronics, pp. 122-125, FIGS. 4-7, (Dec. 3, 2001), and NTT R&D, vol. 48, no. 3, pp. 271-280 (1999)). Optical wiring is applicable to various places such as between electronic units, between boards in an electronic unit, and between chips on a board. FIG. 20 shows optical wiring for signal transmission between chips spaced a short distance. As shown in FIG. 20, an optical waveguide 51 is formed on a printed wiring board 57 on which the chips are mounted. This optical waveguide 51 is used as a transmission line for laser light or the like modulated by a signal, thereby allowing the construction of an optical transmission and communication system.

FIG. 21 shows the structure of the optical waveguide 51. As shown in FIG. 21, the optical waveguide 51 is composed of two claddings 54 and 55 and a core 56 sandwiched between these claddings 54 and 55. The core 56 has a pair of light incident and emergent portions 59a and 59b at the opposite ends. Each of the light incident and emergent portions 59a and 59b is formed as a 45° mirror surface. Further, the cladding 54 is integrally formed with a pair of lens portions 52 at positions respectively corresponding to the light incident and emergent portions 59a and 59b of the core 56.

A manufacturing method for the optical waveguide 51 will now be described with reference to FIGS. 22A to 22F.

As shown in FIG. 22A, a cladding 54 is filled into the cavity defined between an upper mold 53a and a lower mold 53b having in combination a shape corresponding to the cladding 54 with the lens portions 52, thus fabricating the cladding 54 by injection molding as shown in FIG. 22B. Accordingly, the lens portions 52 and the cladding 54 are integrally molded.

As shown in FIG. 22C, a core material 56a is filled into a mold 58. As shown in FIG. 22D, the cladding 54 with the lens portions 52 is attached to the upper surface of the mold 58 with the core material 56a interposed between the cladding 54 and the mold 58, and UV light is next applied to cure the core material 56a. As shown in FIG. 22E, the mold 58 is removed to obtain a laminated structure composed of the cladding 54 and the core 56.

Finally, as shown in FIG. 22F, another cladding 55 previously fabricated by injection molding or the like is bonded to the cladding 55 of the above laminated structure, thus obtaining the optical waveguide 51.

In the conventional optical waveguide and the manufacturing method therefor as shown in FIGS. 21 and 22A to 22F, the lens portions 52 and the cladding 54 are integrally molded by using the upper and lower molds 53a and 53b. Accordingly, the positions of the lens portions 52 are decided in this molding step, and the alignment between the light incident and emergent portions 59a and 59b of the core 56 and the lens portions 52 becomes difficult. As a result, there is a possibility of reduction in alignment accuracy and yield.

SUMMARY OF THE INVENTION

It is accordingly an embodiment of the present invention to provide an optical waveguide device which can improve the yield and can easily and precisely perform the alignment of lens portions for obtaining effective incidence and emergence of light.

It is another embodiment of the present invention to provide a manufacturing method for the optical waveguide device.

It is still another embodiment of the present invention to provide an optical information processing apparatus including the optical waveguide device.

It is a further embodiment of the present invention to provide electronic equipment including the optical information processing apparatus.

In accordance with a first embodiment of the present invention, there is provided an optical waveguide device including a cladding having first and second surfaces opposite to each other; a core laminated to the first surface of the cladding for guiding light in a longitudinal direction thereof, the core having a pair of light incident and emergent portions at the opposite ends; and a pair of lens portions bonded to the second surface of the cladding at the opposite ends corresponding to the light incident and emergent portions of the core.

In accordance with a second embodiment of the present invention, there is provided an optical information processing apparatus including an optical waveguide device; a light emitting device for launching light into the optical waveguide device; and a light receiving device for receiving emergent light from the optical waveguide device; the optical waveguide device including a cladding having first and second surfaces opposite to each other; a core laminated to the first surface of the cladding for guiding light in a longitudinal direction thereof, the core having a pair of light incident and emergent portions at the opposite ends; and a pair of lens portions bonded to the second surface of the cladding at the opposite ends corresponding to the light incident and emergent portions of the core; the light from the light emitting device entering the light incident portion of the core through one of the lens portions; the emergent light from the optical waveguide device emerging from the light emergent portion of the core and passing through the other lens portion to reach the light receiving device.

In accordance with a third embodiment of the present invention, there is provided a manufacturing method for an optical waveguide device including a cladding having first and second surfaces opposite to each other; a core laminated to the first surface of the cladding for guiding light in a longitudinal direction thereof, the core having a pair of light incident and emergent portions at the opposite ends; and a pair of lens portions bonded to the second surface of the cladding at the opposite ends corresponding to the light incident and emergent portions of the core; the manufacturing method including the steps of forming the lens portions; bonding the lens portions to the cladding; and bonding the core and the cladding.

In accordance with a fourth embodiment of the present invention, there is provided electronic equipment including an optical information processing apparatus; a first circuit device provided on the input side of the optical information processing apparatus for supplying an input signal; and a second circuit device provided on the output side of the optical information processing apparatus for receiving an output signal; the optical information processing apparatus including an optical waveguide device; a light emitting device for launching light into the optical waveguide device; and a light receiving device for receiving emergent light from the optical waveguide device; the optical waveguide device including a cladding having first and second surfaces opposite to each other; a core laminated to the first surface of the cladding for guiding light in a longitudinal direction thereof, the core having a pair of light incident and emergent portions at the opposite ends; and a pair of lens portions bonded to the second surface of the cladding at the opposite ends corresponding to the light incident and emergent portions of the core; the light from the light emitting device entering the light incident portion of the core through one of the lens portions; the emergent light from the optical waveguide device emerging from the light emergent portion of the core and passing through the other lens portion to reach the light receiving device.

The term of "core" used in the present invention means not only a single core, but also a plurality of core arrays.

According to the present invention, the pair of lens portions are bonded to the second surface of the cladding at the opposite ends corresponding to the light incident and emergent portions of the core. Accordingly, as compared with the case that the lens portions and the cladding are integrally molded as by the conventional manufacturing method for the optical waveguide as mentioned above, the alignment between the lens portions and the light incident and emergent portions of the core can be performed easily and precisely. Further, the yield can be improved.

The core serves to guide an incident optical signal, and the cladding serves to confine the optical signal in the core. The core is formed of a material having a high refractive index, and the cladding is formed of a material having a refractive index lower than that of the core.

Preferably, the cladding is formed from a flexible sheet, and each of the lens portions is bonded through a lens supporting portion to the second surface of the cladding.

The optical waveguide in the prior art as mentioned above is formed of resin in general, so that it has moisture absorbency and accordingly gradually expands. In the case of using such an optical waveguide, the gradual expansion of the optical waveguide results in gradual deviation of the optical axis.

Further, if the thickness of the optical waveguide is excessive, the deformation of the optical waveguide due to heat, external stress, etc. cannot be absorbed without the application of stress to the core. Accordingly, it is necessary to maintain a thickness of 0.5 mm or less at a central portion of the optical waveguide in the case where the optical waveguide has a length of about 50 mm to 30 mm (in a direction of propagation of light), thereby ensuring the flexibility of a module using the optical waveguide. In the conventional optical waveguide shown in FIG. 21, such a small thickness can be realized by using a state-of-the-art injection molding technique. However, a cost increase is invited.

According to the present invention, the cladding is formed from a flexible sheet, and each of the lens portions is bonded through the lens supporting portion to the second surface of the cladding. Accordingly, the optical waveguide device has high rigidity at the opposite ends of the cladding, so that a bonding strength between the optical waveguide device and a mounting board can be improved. As a result, stable incidence and emergence of light without optical axis deviation can be ensured.

Further, since the cladding is formed from a flexible sheet, the optical waveguide device can be made thin and flexible at a central portion thereof. Accordingly, the deformation of the optical waveguide device due to heat, external stress, etc. can be effectively absorbed without the application of stress to the core.

Further, each lens portion can be fabricated by a general injection molding technique, and an inexpensive sheet material can be used for the flexible sheet as the material of the cladding to thereby reduce the amount of use of an expensive optical resin, thus reducing the cost.

Preferably, the optical waveguide device according to the present invention further includes an additional cladding provided on the core opposite to the cladding, and the additional cladding is formed from a flexible sheet.

In the manufacturing method for the optical waveguide device according to the present invention, it is preferable that the lens portions are bonded to the second surface of the cladding, and the core is next bonded to the first surface of the cladding in the condition where the light incident and emergent portions of the core are respectively aligned to the lens portions. In the conventional manufacturing method for the optical waveguide as mentioned above, the cladding and the lens portions are integrally molded. Accordingly, in the case of changing the placement of each lens portion, the shapes of the upper and lower molds must be changed with difficulty. To the contrary, according to the manufacturing method of the present invention, the lens portions previously fabricated are bonded to the second surface of the cladding. Accordingly, the flexibility of placement of each lens portion can be increased and the alignment between each lens portion and the cladding can be easily performed.

In the manufacturing method for the optical waveguide device according to the present invention, it is also preferable that the core is bonded to the first surface of the cladding, and the lens portions are next bonded to the second surface of the cladding at positions respectively corresponding to the light incident and emergent portions of the core. According to this manufacturing method, the cladding is bonded to the core before bonding the lens portions to the cladding. Accordingly, the core can be formed more easily. Further, the lens portions are bonded to the cladding in the condition where the cladding and the core have been bonded together. Accordingly, the alignment between the lens portions and the light incident and emergent portions of the core can be performed more easily and precisely.

The optical waveguide device according to the present invention is suitably applicable to an optical information processing apparatus such as optical wiring including a light emitting device (e.g., laser) for launching light into the core and a light receiving device (e.g., optical wiring or photodetector) for receiving emergent light from the core.

Preferably, the optical information processing apparatus further includes a first converter connected through a driver amplifier to the light emitting device for converting a parallel input signal into a serial input signal; and a second converter connected through a transimpedance amplifier and an I/V conversion amplifier to the light receiving device for converting a serial output signal into a parallel output signal.

The optical information processing apparatus according to the present invention is suitably applicable to electronic equipment including a first circuit device provided on the input side of the optical information processing apparatus for supplying an input signal and a second circuit device provided on the output side of the optical information processing apparatus for receiving an output signal.

Other objects and features of the invention will be more fully understood from the following detailed description and appended claims when taken with the accompanying drawings.

BRIEF DESCRIPTION OF THE DRAWINGS

FIGS. 2A to 2F are schematic sectional views showing a manufacturing method for the optical waveguide device shown in FIGS. 1A and 1B;

FIGS. 3A to 3E are schematic sectional views showing another manufacturing method for the optical waveguide device shown in FIGS. 1A and 1B according to a second preferred embodiment of the present invention;

DETAILED DESCRIPTION OF THE PREFERRED EMBODIMENTS

Some preferred embodiments of the present invention will now be described with reference to the drawings.

First Preferred Embodiment

Figure 1A:
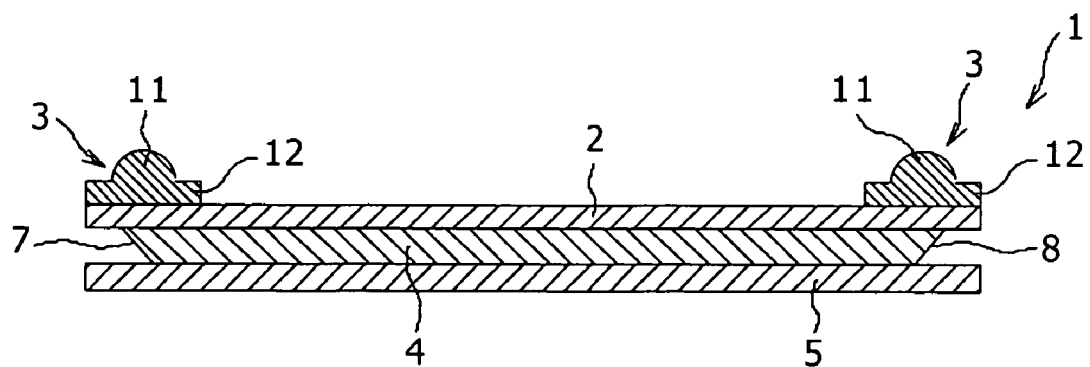
FIG. 1A is a schematic sectional view of an optical waveguide device according to a first preferred embodiment of the present invention and FIG. 1B is an exploded view of FIG. 1A.
Figure 1B:
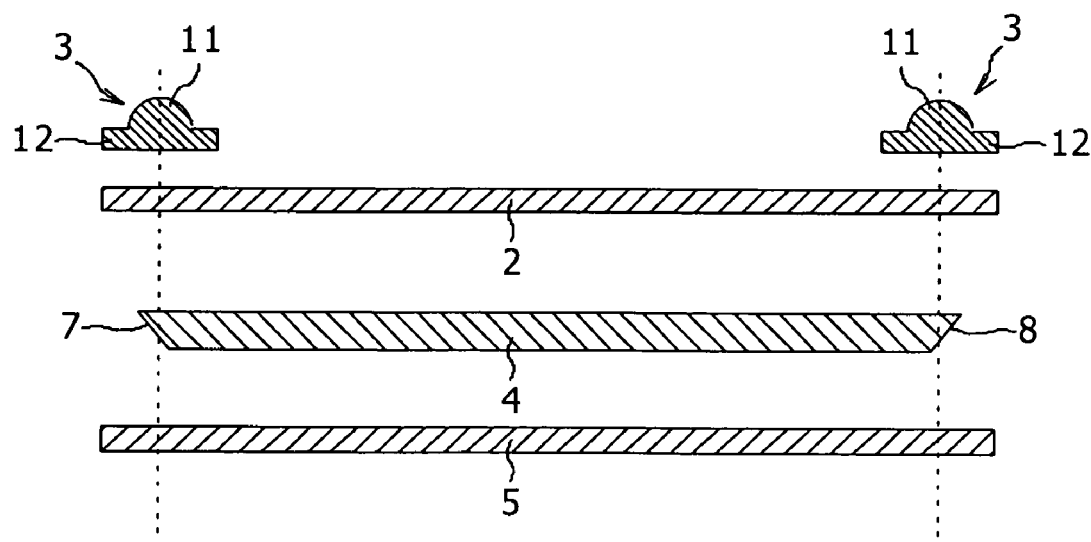

FIG. 1A is a schematic sectional view of an optical waveguide device 1 according to the present invention, and FIG. 1B is an exploded view of FIG. 1A.

As shown in FIGS. 1A and 1B, the optical waveguide device 1 has a laminated structure composed of a first cladding 2, a second cladding 5 independent of the first cladding 2, and a core 4 sandwiched between the first and second claddings 2 and 5, wherein light is guided in the core 4. The core 4 serves to guide an incident optical signal, and the claddings 2 and 5 serve to confine the optical signal in the core 4. The core 4 is formed of a material having a high refractive index, and the claddings 2 and 5 are formed of a material having a refractive index lower than that of the core 4.

The cladding 2 is formed from a flexible sheet, and a pair of light collimating or a focusing section 3 are bonded to the upper surface of the cladding 2 at its opposite ends corresponding to light incident and emergent portions 7 and 8 of the core 4. Each light collimating or a focusing section 3 is an integral member independent of the cladding 2 and composed of a lens portion 11 and a lens supporting portion 12 for supporting the lens portion 11. The lens supporting portion 12 of each light collimating or a focusing section 3 is bonded to the cladding 2.

Thus, each light collimating or a focusing section 3 is an integral member composed of the lens portion 11 and the lens supporting portion 12, and each lens supporting portion 12 is bonded to the cladding 2. Accordingly, the optical waveguide device 1 has high rigidity at the opposite ends of the cladding 2, so that a bonding strength between the optical waveguide device 1 and a mounting board (not shown) can be improved. As a result, stable incidence and emergence of light without optical axis deviation can be ensured.

Further, since the cladding 2 is formed from a flexible sheet, the optical waveguide device 1 can be made thin and flexible at a central portion thereof. Accordingly, the deformation of the optical waveguide device 1 due to heat, external stress, etc. can be effectively absorbed without the application of stress to the core 4.

Further, each light collimating or a focusing section 3 as an integral member composed of the lens portion 11 and the lens supporting portion 12 can be fabricated by a general injection molding technique, and an inexpensive sheet material can be used for the flexible sheet as the material of the cladding 2 to thereby reduce the amount of use of an expensive optical resin, thus reducing the cost.

Each of the light incident and emergent portions 7 and 8 of the core 4 is formed as an inclined mirror surface, e.g., 45° mirror surface. The core 4 with such inclined mirror surfaces 7 and 8 can be formed by injection molding. Thus, the inclined mirror surfaces 7 and 8 can be formed by injection molding without direct processing to the core 4. Accordingly, the surface condition of the inclined mirror surfaces 7 and 8 can be made smooth without damage in fabrication, so that the optical waveguide device 1 can be fabricated with good quality easily and precisely. Since the light incident and emergent portions 7 and 8 of the core 4 are formed as the inclined mirror surfaces, an optical signal output from a light emitting device can be made to efficiently enter the core 4. The incident optical signal can be guided in the core 4 and can be made to efficiently emerge toward a light receiving device. The material of the core 4 may be selected from any materials known in the art, such as UV (ultra-violet) curable resin (e.g., fluorinated polyimide).

It is more preferable that a flexible sheet is also used as the second cladding 5 provided on the lower surface of the core 4 opposite to the upper surface thereof where each light collimating or a focusing section 3 as an integral member composed of the lens portion 11 and the lens supporting portion 12 is bonded.

According to the optical waveguide device 1, the pair of light collimating or a focusing section 3 independent of the cladding 2 are bonded to the upper surface of the cladding 2 at its opposite ends corresponding to the light incident and emergent portions 7 and 8 of the core 4, and each light collimating or a focusing section 3 is formed as an integral member composed of the lens portion 11 and the lens supporting portion 12. Accordingly, as compared with the conventional manufacturing method for the optical waveguide mentioned above wherein each lens portion and the cladding are integrally molded, the alignment between the lens portions 11 and the light incident and emergent portions 7 and 8 of the core 4 can be performed easily and precisely, and the yield can be improved.

The optical waveguide device 1 can be suitably applied to an optical information processing apparatus such as optical wiring including a light emitting device (e.g., laser) for launching light into the core 4 of the optical waveguide device 1 and a light receiving device (e.g., optical wiring or photodetector) for receiving emergent light from the core 4.

In this case, a converter for converting a parallel input signal into a serial input signal is preferably connected through a driver amplifier to the light emitting device, and a converter for converting a serial output signal into a parallel output signal is preferably connected through a transimpedance amplifier and an I/V conversion amplifier to the light receiving device.

The optical information processing apparatus such as optical wiring according to the present invention can be suitably applied to electronic equipment including a circuit device for supplying an input signal to the input side of the optical information processing apparatus and a circuit device for receiving an output signal from the output side of the optical information processing apparatus.

A manufacturing method for the optical waveguide device 1 will now be described with reference to FIGS. 2A to 2F.

As shown in FIG. 2A, a pair of upper and lower molds 6a and 6b having a shape in combination corresponding to the shape of each light collimating or a focusing section 3 are used, and a material 3a of each light collimating or a focusing section 3 is filled into the cavity defined by the upper and lower molds 6a and 6b. Thereafter, the material 3a is cured to fabricate each light collimating or a focusing section 3. Thus, each light collimating or a focusing section 3 can be easily fabricated as an integral member composed of the lens portion 11 and the lens supporting portion 12 by a general injection molding technique.

As shown in FIG. 2B, the pair of light collimating or a focusing section 3 fabricated above are bonded to the upper surface of the first cladding 2 formed from a flexible sheet at its opposite ends. At this time, the lens supporting portion 12 of each light collimating or a focusing section 3 is bonded to the cladding 2.

As shown in FIG. 2C, a core material 4a is filled into a mold 13. As shown in FIG. 2D, the cladding 2 having the pair of light collimating or a focusing section 3 fabricated above is attached to the upper surface of the mold 13 with the core material 4a interposed between the cladding 2 and the mold 13, and UV light is next applied to thereby cure the core material 4a. As shown in FIG. 2E, the mold 13 is removed to obtain a laminated structure composed of the cladding 2 and the core 4.

In the step shown in FIG. 2D, the light incident and emergent portions 7 and 8 of the core 4 are formed as inclined mirror surfaces, e.g., 45° mirror surfaces by injection molding. Thus, the inclined mirror surfaces 7 and 8 can be formed without direct processing to the core 4. Accordingly, the surface condition of the inclined mirror surfaces 7 and 8 can be made smooth without damage in fabrication, so that the optical waveguide device 1 can be fabricated with good quality easily and precisely.

As shown in FIG. 2F, the second cladding 5 (e.g., flexible sheet) 5 is bonded to the laminated structure composed of the first cladding 2 and the core 4, more specifically, to the lower surface of the core 4 opposite to the upper surface thereof where each light collimating or a focusing section 3 is bonded.

Thus, the optical waveguide device 1 can be fabricated by the manufacturing method mentioned above. According to the manufacturing method for the optical waveguide device 1 as mentioned above, each light collimating or a focusing section 3 previously fabricated is bonded to the upper surface of the cladding 2. Accordingly, the flexibility of placement of each light collimating or a focusing section 3 can be increased and the alignment between each lens portion 11 and the cladding 2 can be easily performed. In contrast, according to the conventional manufacturing method for the optical waveguide mentioned above, the cladding and each lens portion are integrally molded. Accordingly, in the case of changing the placement of each lens portion, the shapes of the upper and lower molds must be changed with difficulty.

Second Preferred Embodiment

FIGS. 3A to 3E are schematic sectional views showing another manufacturing method for the optical waveguide device 1.

As shown in FIG. 3A, a core material 4a is filled into a mold 13. As shown in FIG. 3B, the first cladding 2 formed from a flexible sheet is attached to the upper surface of the mold 13 with the core material 4a interposed between the cladding 2 and the mold 13, and UV light is next applied to thereby cure the core material 4a. As shown in FIG. 3C, the mold 13 is removed to obtain a laminated structure composed of the cladding 2 and the core 4.

As shown in FIG. 3D, the pair of light collimating or a focusing section 3 (each formed as an integral member composed of the lens portion 11 and the lens supporting portion 12) previously fabricated by injection molding as similar to the step of FIG. 2A are bonded to the upper surface of the cladding 2 opposite to the lower surface thereof where the core 4 is bonded, at the opposite ends corresponding to the light incident and emergent portions 7 and 8 of the core 4.

As shown in FIG. 3E, the second cladding (e.g., flexible sheet) 5 is bonded to the laminated structure composed of the cladding 2 and the core 4, more specifically, to the lower surface of the core 4.

According to this manufacturing method, the cladding 2 is bonded to the core 4 before bonding each light collimating or a focusing section 3 to the cladding 2. Accordingly, the core 4 can be formed more easily. Further, each light collimating or a focusing section 3 is bonded to the cladding 2 in the condition where the cladding 2 and the core 4 have been bonded together. Accordingly, the alignment between the lens portions 11 and the light incident and emergent portions 7 and 8 of the core 4 can be performed more easily and precisely.

Third Preferred Embodiment

Figure 4A:
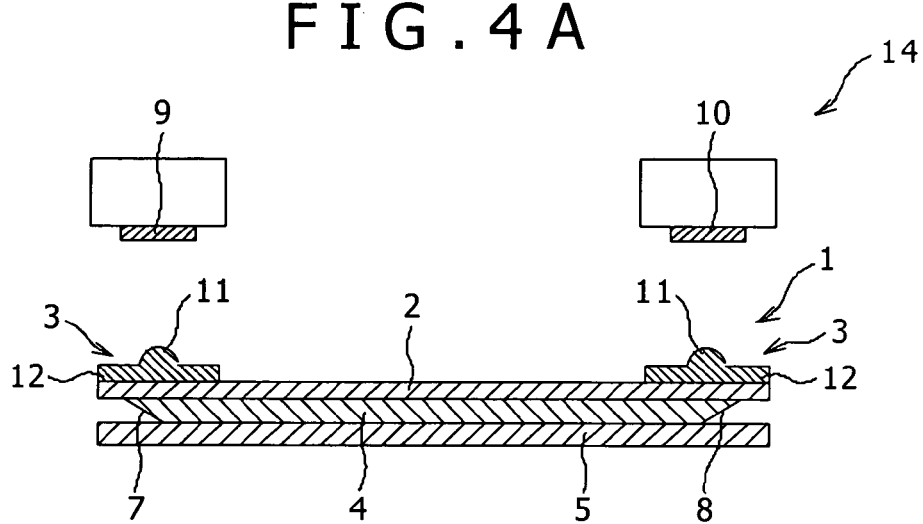
FIG. 4A is a schematic sectional view of an optical information processing apparatus according to a third preferred embodiment of the present invention.
Figure 4B:
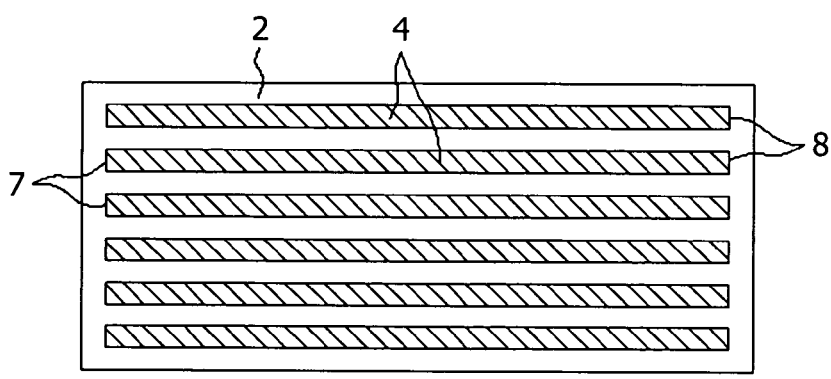
FIG. 4B is a bottom plan view of an optical waveguide device included in the optical information processing apparatus shown in FIG. 4A.
Figure 4C:
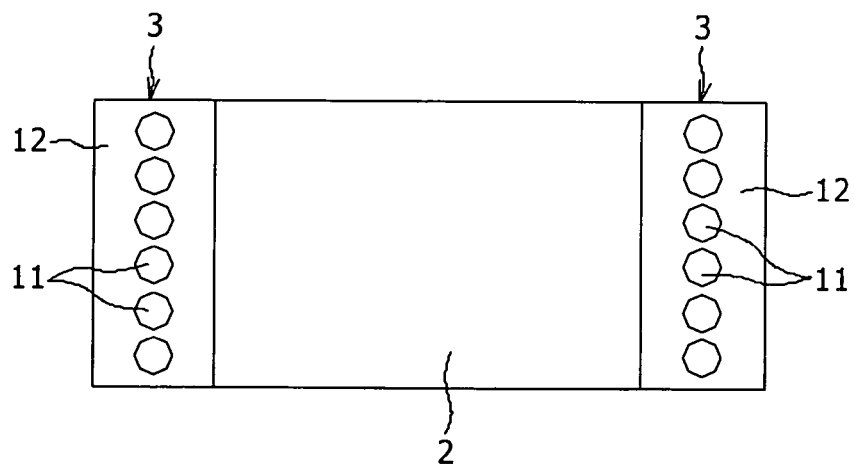
FIG. 4C is a top plan view of the optical waveguide device shown in FIG. 4A.

FIGS. 4A to 4C show an optical information processing apparatus 14 according to the present invention which includes an optical waveguide device 1 according to the present invention, a plurality of light emitting devices (e.g., lasers) 9 for respectively launching light into a plurality of cores 4 of the optical waveguide device 1, and a plurality of light receiving devices (e.g., photodetectors) 10 for respectively receiving emergent light from the plural cores 4. More specifically, FIG. 4A is a schematic sectional view of the optical information processing apparatus 14, FIG. 4B is a bottom plan view of the optical waveguide device 1 shown in FIG. 4A with the second cladding 5 removed, and FIG. 4C is a top plan view of the optical waveguide device 1 shown in FIG. 4A.

As shown in FIG. 4B, the plural cores 4 are arranged in parallel with a given pitch on the cladding 2, and each core 4 has a pair of light incident and emergent portions 7 and 8 each formed as a 45° mirror surface. The light incident portions 7 of the plural cores 4 are aligned in position in the direction of arrangement of the plural cores 4 (i.e., in the transverse direction of the cladding 2). Similarly, the light emergent portions 8 of the plural cores 4 are aligned in position in the direction of arrangement of the plural cores 4.

The plural light emitting devices 9 are arranged at positions respectively corresponding to the light incident portions 7 of the plural cores 4. Although not shown, the gap in each light emitting device 9 is provided with a through electrode for electrically connecting the light emitting device 9 and a semiconductor integrated circuit chip. Similarly, the plural light receiving devices 10 are arranged at positions respectively corresponding to the light emergent portions 8 of the plural cores 4, and the gap in each light receiving device 10 is provided with a through electrode for electrically connecting the light receiving device 10 and another semiconductor integrated circuit chip.

Accordingly, in the optical information processing apparatus 14 shown in FIGS. 4A to 4C, the plural light emitting devices 9 are arranged with the same pitch as the arrangement pitch of the plural cores 4, and the plural light receiving devices 10 are also arranged with the same pitch as the arrangement pitch of the plural cores 4.

As shown in FIG. 4C, a pair of light collimating or a focusing section 3 are bonded to the upper surface of the cladding 2 at its opposite ends corresponding to the positions of the array of the light incident portions 7 and the array of the light emergent portions 8 of the plural cores 4. That is, each light collimating or a focusing section 3 is formed as an integral member composed of a plurality of lens portions 11 and a lens supporting portion 12 for supporting the plural lens portions 11, wherein the plural lens portions 11 are respectively aligned to the plural light incident and emergent portions 7 and 8.

The operation mechanism of the optical information processing apparatus 14 will now be described. An electrical signal transmitted from one semiconductor integrated circuit chip (not shown) is converted into an optical signal in each light emitting device 9, and the optical signal is output from each light emitting device 9. The optical signal thus output is focused by the corresponding lens portion 11 of the light collimating or a focusing section 3 on the incident side to enter the light incident portion 7 of the corresponding core 4. The incident light is reflected on the light incident portion 7 formed as a 45° mirror surface, and is then guided in the core 4 in its longitudinal direction to reach the light emergent portion 8. The light thus guided is reflected again on the light emergent portion 8 formed as a 45° mirror surface to emerge from the core 4. The emergent light is focused by the light collimating or a focusing section 3 on the emergent side, and is then received by the corresponding light receiving device 10, in which the optical signal is converted into an electrical signal. The electrical signal is transmitted from the light receiving device 10 to another semiconductor integrated circuit chip (not shown). This operation mechanism is similarly performed in other preferred embodiments to be described later.

Fourth Preferred Embodiment

Figure 5A:
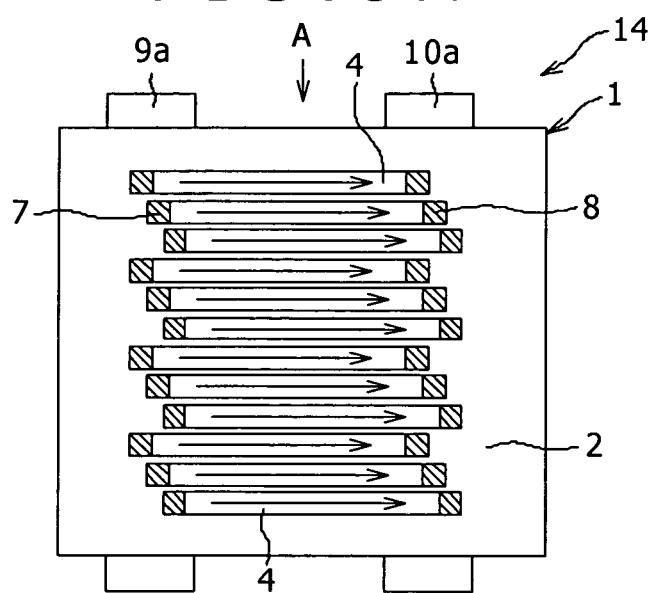
FIG. 5A is a schematic plan view of an optical information processing apparatus according to a fourth preferred embodiment of the present invention.
Figure 5B:
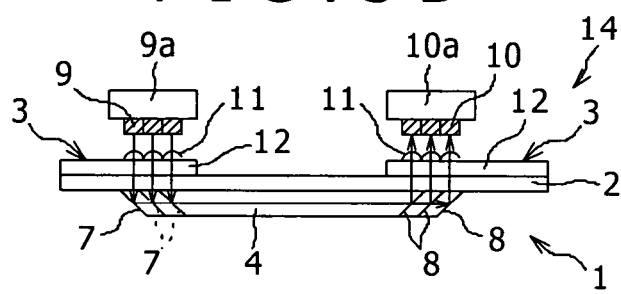
FIG. 5B is a side view taken in the direction of arrow A in FIG. 5A.
Figure 5C:
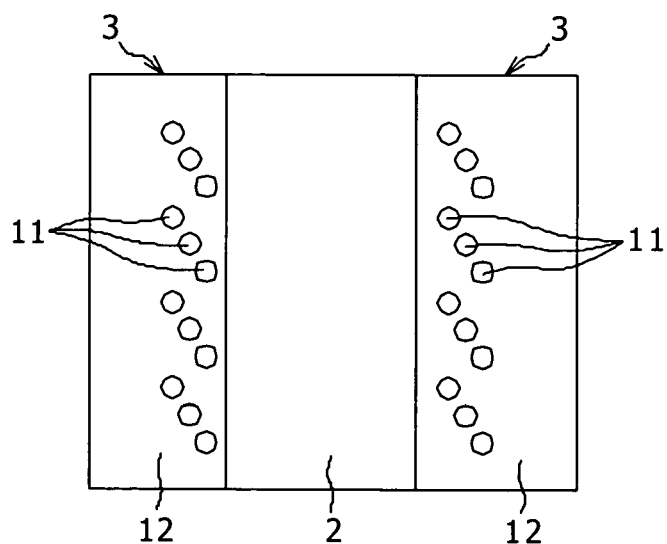
FIG. 5C is a schematic plan view of an optical waveguide device included in the optical information processing apparatus shown in FIG. 5A.

FIG. 5A is a schematic plan view of an optical information processing apparatus 14 including an optical waveguide device 1 according to the present invention, a light emitting device array 9a, and a light receiving device array 10a. FIG. 5B is a side view taken in the direction of arrow A in FIG. 5A, and FIG. 5C is a schematic plan view of a cladding 2 on which a pair of light collimating or a focusing section 3 are bonded. Each light collimating or a focusing section 3 is formed as an integral member composed of a plurality of lens portions 11 and a lens supporting portion 12 for supporting the plural lens portions 11. In FIGS. 5A to 5C, the cladding 5 as shown in FIGS. 1A and 1B is not shown.

As shown in FIG. 5A, a plurality of cores 4 are arranged in parallel at a given pitch. Each core 4 has a pair of light incident and emergent portions 7 and 8 at the opposite ends. Each of the light incident and emergent portions 7 and 8 is formed as a 45° mirror surface. In any two adjacent ones of the plural cores 4, the light incident and emergent portions 7 and 8 of one of the two adjacent cores 4 are shifted from the light incident and emergent portions 7 and 8 of the other core 4 in the longitudinal direction of the cores 4.

The light emitting device array 9a includes a plurality of light emitting devices 9 arranged at positions respectively corresponding to the light incident portions 7 of the plural cores 4. Although not shown, the gap in each light emitting device 9 is provided with a through electrode for electrically connecting the light emitting device 9 and a semiconductor integrated circuit chip. Similarly, the light receiving device array 10a includes a plurality of light receiving devices 10 arranged at positions respectively corresponding to the light emergent portions 8 of the plural cores 4, and the gap in each light receiving device 10 is provided with a through electrode for electrically connecting the light receiving device 10 and another semiconductor integrated circuit chip.

As shown in FIG. 5C, the plural lens portions 11 of the light collimating or a focusing section 3 on the incident side are arranged at positions respectively corresponding to the light incident portions 7 of the plural cores 4. Similarly, the plural lens portions 11 of the light collimating or a focusing section 3 on the emergent side are arranged at positions respectively corresponding to the light emergent portions 8 of the plural cores 4. Each lens portion 11 is integral with the lens supporting portion 12 of each means 3, and the lens supporting portion 12 of each means 3 is bonded to the cladding 2.

In this preferred embodiment, the plural cores 4 are divided into a plurality of groups, and each group is composed of a given number of cores 4 shifted with a given pitch in the longitudinal direction of the cores 4. Accordingly, in each group, the light incident portions 7 of the cores 4 are shifted with this given pitch in the longitudinal direction of the cores 4, and the light emergent portions 8 of the cores 4 are shifted with the same pitch in the longitudinal direction of the cores 4. Accordingly, the light emitting devices 9 respectively corresponding to these light incident portions 7 of the cores 4 in each group are shifted with the same pitch in the longitudinal direction of the cores 4, and the light receiving devices 10 respectively corresponding to these light emergent portions 8 of the cores 4 in each group are shifted with the same pitch in the longitudinal direction of the cores 4. For example, in the case that the pitch of the light incident portions 7 of the cores 4 in each group in the longitudinal direction of the cores 4 is 100 µm, the pitch of the corresponding light emitting devices 9 in the longitudinal direction of the cores 4 is 100 µm. Similarly, in the case that the pitch of the light emergent portions 8 of the cores 4 in each group in the longitudinal direction of the cores 4 is 100 µm, the pitch of the corresponding light receiving devices 10 in the longitudinal direction of the cores 4 is 100 µm.

On the other hand, the pitch of the light emitting devices 9 aligned in the transverse direction of the cladding 2 is equal to the sum of the distances between the cores 4 in each group. Similarly, the pitch of the light receiving devices 10 aligned in the transverse direction of the cladding 2 is equal to the sum of the distances between the cores 4 in each group. For example, in the case that the pitch of the cores 4 in the transverse direction of the cladding 2 is 20 µm, the pitch of the light emitting devices 9 aligned in the transverse direction of the cladding 2 is 100 µm. Similarly, in the case that the pitch of the cores 4 in the transverse direction of the cladding 2 is 20 μm, the pitch of the light receiving devices 10 aligned in the transverse direction of the cladding 2 is 100 μm.

With this longitudinally shifted arrangement of the cores 4 in each group, the light emitting and receiving devices 9 and 10 (which will be hereinafter referred to also as optical devices 9 and 10) respectively corresponding to the light incident and emergent portions 7 and 8 of the cores 4 can be arranged two-dimensionally. For example, in the case that the optical devices 9 and 10 are arranged with a pitch of 100 μm in the transverse direction of the cladding 2, the cores 4 can be arranged with a finer pitch of 20 μm.

In other words, the optical devices 9 and 10 are arranged with a relatively large pitch such that the influence of crosstalk due to interference of light or heat generation from the optical devices can be avoided, and the degree of integration of the cores 4 can be increased.

Since the cores 4 are arranged with a high degree of integration and the optical devices 9 and 10 are arranged two-dimensionally, any wasted space can be eliminated and the footprint of each optical device can be reduced. Accordingly, a further cost reduction can be expected.

Fifth Preferred Embodiment

Figure 6A:
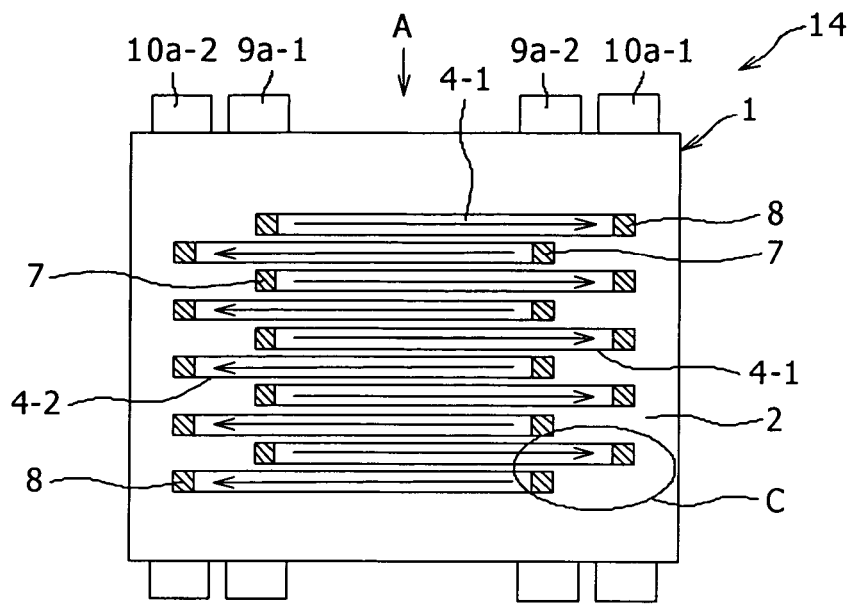
FIG. 6A is a schematic plan view of an optical information processing apparatus according to a fifth preferred embodiment of the present invention.
Figure 6B:
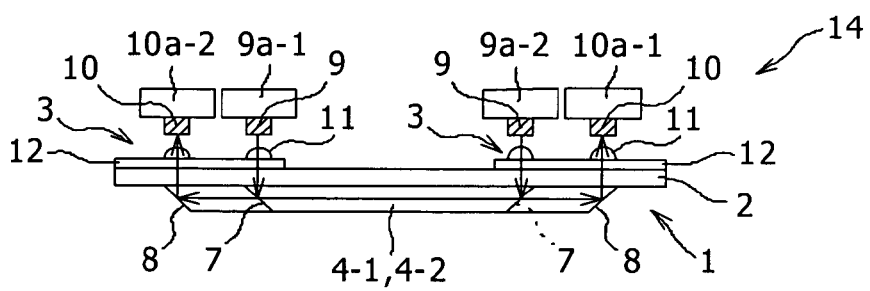
FIG. 6B is a side view taken in the direction of arrow A in FIG. 6A.
Figure 6C:
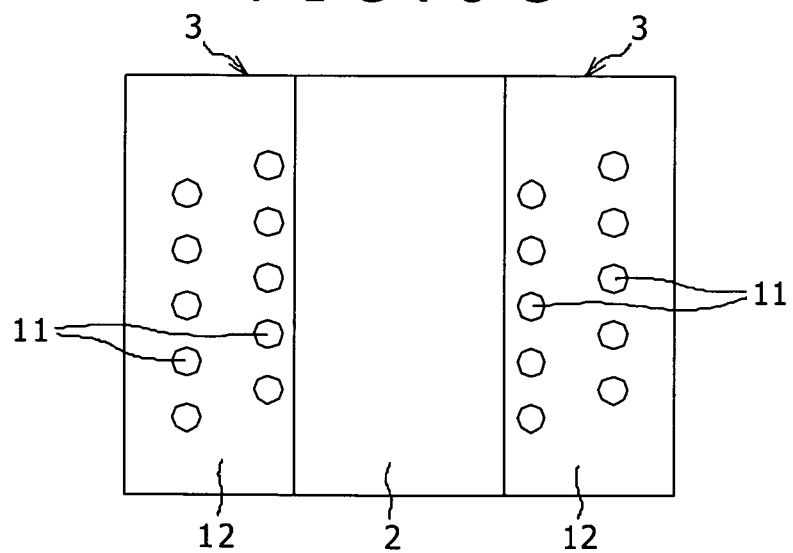
FIG. 6C is a schematic plan view of an optical waveguide device included in the optical information processing apparatus shown in FIG. 6A.

FIG. 6A is a schematic plan view of an optical information processing apparatus 14 including an optical waveguide device 1 according to the present invention, two light emitting device arrays 9a-1 and 9a-2, and two light receiving device arrays 10a-1 and 10a-2. FIG. 6B is a side view taken in the direction of arrow A in FIG. 6A, and FIG. 6C is a schematic plan view of a cladding 2 on which a pair of light collimating or a focusing section 3 are bonded. Each light collimating or a focusing section 3 is formed as an integral member composed of a plurality of lens portions 11 and a lens supporting portion 12 for supporting the plural lens portions 11. In FIGS. 6A to 6C, the cladding 5 as shown in FIGS. 1A and 1B is not shown.

As shown in FIG. 6A, a plurality of first and second cores 4-1 and 4-2 are alternately arranged in parallel at a given pitch in such a manner that the plural first cores 4-1 are shifted by a given amount from the plural second cores 4-2 in the longitudinal direction of the cores 4-1 and 4-2. Accordingly, the light incident portion 7 of each first core 4-1 is shifted by the given amount from the light incident portion 7 of each second core 4-2 in the longitudinal direction of the cores 4-1 and 4-2, and the light emergent portion 8 of each first core 4-1 is shifted by the given amount from the light emergent portion 8 of each second core 4-2 in the longitudinal direction of the cores 4-1 and 4-2.

The light emitting device array 9a-1 includes a plurality of light emitting devices 9 arranged at positions respectively corresponding to the light incident portions 7 of the first cores 4-1, and the light receiving device array 10a-2 includes a plurality of light receiving devices 10 arranged at positions respectively corresponding to the light emergent portions 8 of the second cores 4-2. These arrays 9a-1 and 10a-2 are located near one longitudinal end of the cladding 2.

Similarly, the light receiving device array 10a-l includes a plurality of light receiving devices 10 arranged at positions respectively corresponding to the light emergent portions 8 of the first cores 4-1, and the light emitting device array 9a-2 includes a plurality of light emitting devices 9 arranged at positions respectively corresponding to the light incident portions 7 of the second cores 4-2. These arrays 10a-l and 9a-2 are located near the other longitudinal end of the cladding 2.

Thus, the light emitting devices 9 corresponding to the first cores 4-1 and the light receiving devices 10 corresponding to the second cores 4-2 are alternately arranged in zigzag. Similarly, the light receiving devices 10 corresponding to the first cores 4-1 and the light emitting devices 9 corresponding to the second cores 4-2 are alternately arranged in zigzag. Accordingly, light is guided in the first cores 4-1 in a first direction, and light is guided in the second cores 4-2 in a second direction opposite to the first direction.

As shown in FIG. 6C, the plural lens portions 11 of the light collimating or a focusing section 3 located near one longitudinal end of the cladding 2 are arranged in zigzag so as to correspond to the light emitting devices 9 of the array 9a-1 and the light receiving devices 10 of the array 10a-2. Similarly, the plural lens portions 11 of the light collimating or a focusing section 3 located near the other longitudinal end of the cladding 2 are arranged in zigzag so as to correspond to the light emitting devices 9 of the array 9a-2 and the light receiving devices 10 of the array 10a-1. Each lens portion 11 is integral with the lens supporting portion 12 of each means 3, and the lens supporting portion 12 of each means 3 is bonded to the cladding 2. Accordingly, incident light from each light emitting device 9 can be effectively launched into the corresponding core 4-1 or 4-2, thereby ensuring efficient optical coupling. Similarly, emergent light from each core 4-1 or 4-2 can be effectively received by the corresponding light receiving device 10.

As mentioned above, the light emitting devices 9 and the light receiving devices 10 are alternately arranged so as to correspond to the cores 4-1 and 4-2 alternately arranged in parallel. Accordingly, as shown by an enclosed portion C in FIG. 6A, the light emitting device 9 and the light receiving device 10 respectively corresponding to input/output pads connected to a specific circuit in a semiconductor integrated circuit chip can be located at positions close to each other, so that the length of electrical wiring can be shortened to thereby facilitate the protection from high-frequency problems.

Sixth Preferred Embodiment

Figure 7A:
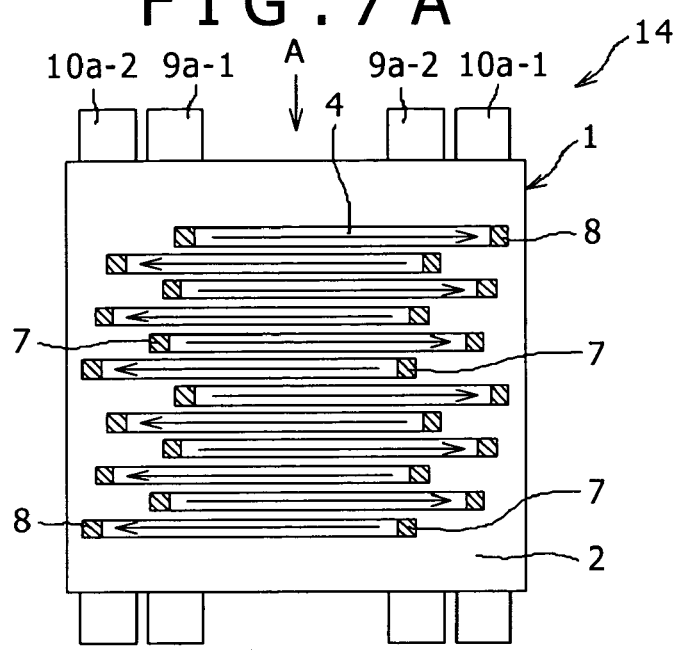
FIG. 7A is a schematic plan view of an optical information processing apparatus according to a sixth preferred embodiment of the present invention.
Figure 7D:
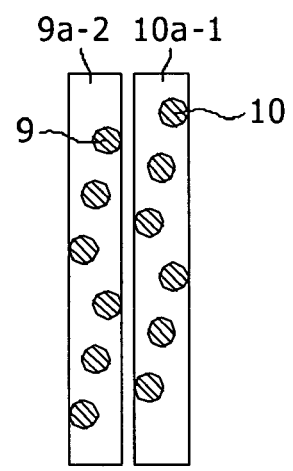
FIG. 7D is a plan view showing the arrangement of light emitting devices and light receiving devices in the optical information processing apparatus shown in FIG. 7A.
Figure 7B:
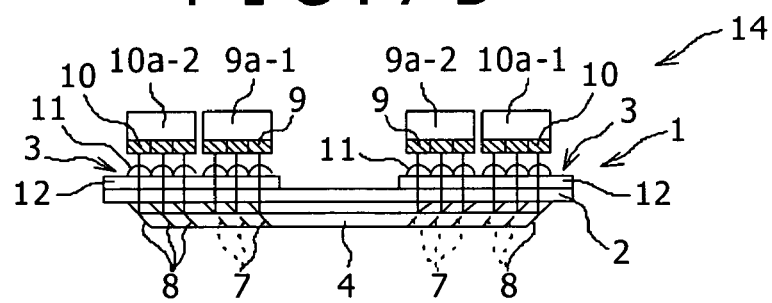
FIG. 7B is a side view taken in the direction of arrow A in FIG. 7A.
Figure 7C:
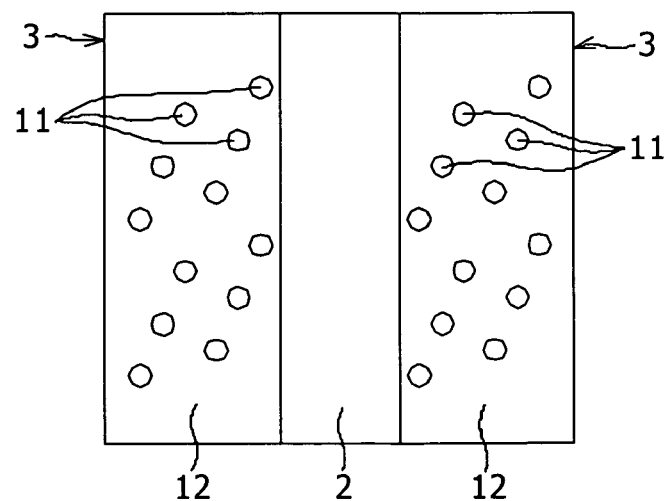
FIG. 7C is a schematic plan view of an optical waveguide device included in the optical information processing apparatus shown in FIG. 7A.

FIG. 7A is a schematic plan view of an optical information processing apparatus 14 including an optical waveguide device 1 according to the present invention, two light emitting device arrays 9a-1 and 9a-2, and two light receiving device arrays 10a-1 and 10a-2. FIG. 7B is a side view taken in the direction of arrow A in FIG. 7A, and FIG. 7C is a schematic plan view of a cladding 2 on which a pair of light collimating or a focusing section 3 are bonded. Each light collimating or a focusing section 3 is formed as an integral member composed of a plurality of lens portions 11 and a lens supporting portion 12 for supporting the plural lens portions 11. FIG. 7D is a plan view showing the arrangement of light receiving devices 10 in the light receiving device array 10a-1 and the arrangement of light emitting devices 9 in the light emitting device array 9a-2. In FIGS. 7A to 7D, the cladding 5 as shown in FIGS. 1A and 1B is not shown.

The configuration of this preferred embodiment is obtained by combining the configuration of the fourth preferred embodiment and the configuration of the fifth preferred embodiment. That is, as in the fifth preferred embodiment, the light emitting devices 9 and the light receiving devices 10 are alternately arranged so as to correspond to the cores 4 arranged in parallel. Accordingly, the direction of propagation of light in one of the adjacent cores 4 is opposite to that in the other core 4.

Further, as in the fourth preferred embodiment, in each of the optical device arrays 9a-1, 9a-2, 10a-1, and 10a-2, the adjacent optical devices 9 are shifted from each other in the longitudinal direction of the cores 4, and the adjacent optical devices 10 are similarly shifted from each other in the longitudinal direction of the cores 4 as shown in FIG. 7D.

As shown in FIG. 7C, the plural lens portions 11 of each light collimating or a focusing section 3 are arranged so as to correspond to the optical devices 9 and 10 in the arrays 9a-1 and 10a-2 (similarly in the arrays 9a-2 and 10a-1). Each lens portion 11 is integral with the lens supporting portion 12 of each means 3, and the lens supporting portion 12 of each means 3 is bonded to the cladding 2. Accordingly, incident light from each light emitting device 9 can be effectively launched into the corresponding core 4, thereby ensuring efficient optical coupling. Similarly, emergent light from each core 4 can be effectively received by the corresponding light receiving device 10.

Further, as compared with the case where the optical devices in each optical device array are linearly arranged (aligned in the transverse direction of the cladding), the pitch of the optical devices in this preferred embodiment can be increased. Accordingly, the effect of the fifth preferred embodiment can be exhibited also in this preferred embodiment. Simultaneously, the optical devices 9 and 10 can be arranged with a relatively large pitch such that the influence of crosstalk due to interference of light or heat generation from the optical devices can be avoided, and the degree of integration of the cores 4 can be increased.

Seventh Preferred Embodiment

The optical waveguide device according to the present invention may be directly mounted on a printed wiring board. As another case, the optical waveguide device according to the present invention may be set in a socket to configure an opto-electric composite device, which may be mounted on a printed wiring board.

Figure 8A:
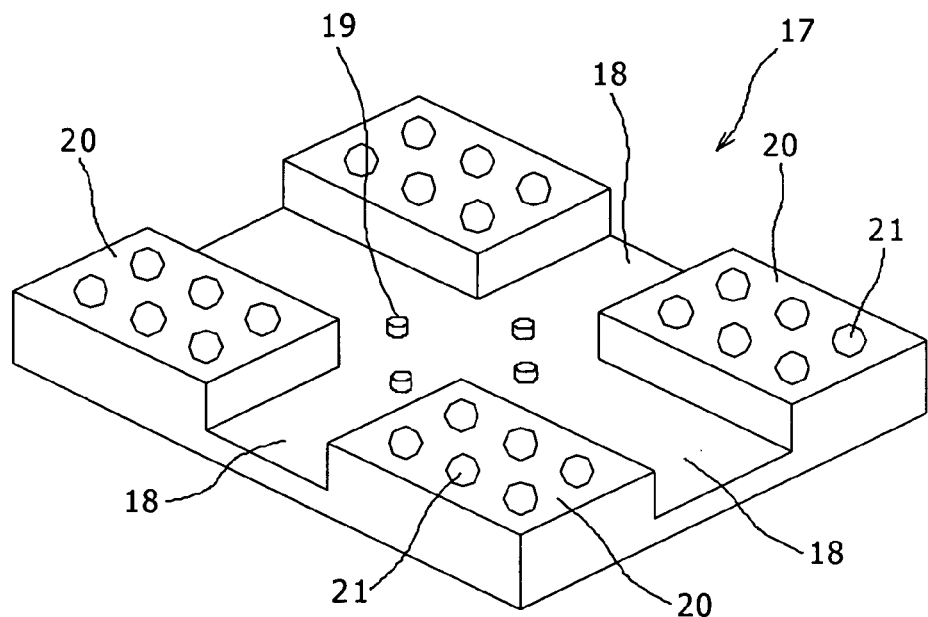
FIG. 8A is a schematic perspective view of a socket according to a seventh preferred embodiment of the present invention as viewed from the upper side thereof.
Figure 8B:
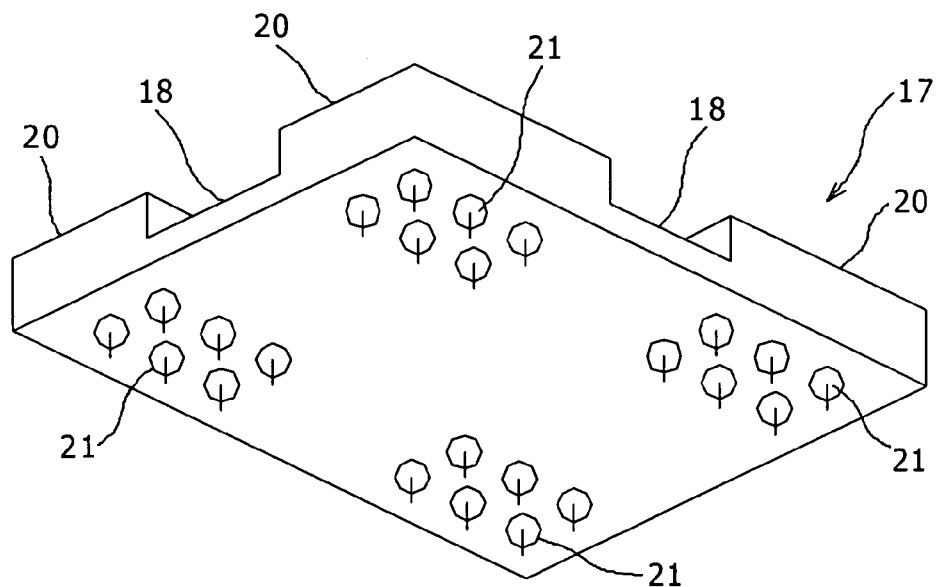
FIG. 8B is a schematic perspective view of the socket as viewed from the lower side thereof.

FIG. 8A is a schematic perspective view of such a socket 17 as viewed from its upper side where the optical waveguide device is set, and FIG. 8B is a schematic perspective view of the socket 17 as viewed from its lower side.

As shown in FIGS. 8A and 8B, the socket 17 is provided with positioning means having a recess/projection structure for positioning and fixing the optical waveguide device. More specifically, the recess/projection structure has a plurality of recesses 18 each for engaging the optical waveguide device to position it in its transverse direction and a plurality of projections 19 each for positioning the optical waveguide device in its longitudinal direction. The depth of each recess 18 is larger than the thickness of the optical waveguide device.

The recess/projection structure of the socket 17 further has a plurality of flat raised surfaces 20. Each flat raised surface 20 is provided with conducting means for conducting the upper and lower surfaces of the socket 17, such as terminal pins 21. As will be hereinafter described, an interposer on which the light emitting devices and/or the light receiving devices are mounted is fixed to the flat raised surfaces 20 of the socket 17.

The socket 17 is formed of any dielectric resin known in the art, such as glass-containing PES (polyethylene sulfide) resin and glass-containing PET (polyethylene terephthalate) resin. As to such a material of the socket 17, there are numerous data on its kind, dielectric property, and reliability, and there are various manufactures handling the material. Accordingly, the socket 17 is a structure easy to accept in respect of function, cost, reliability, etc., and it is easy to merge this structure and an existing printed wiring board mounting process.

A manufacturing method for the socket 17 is not especially limited. For example, the socket 17 can be easily fabricated by molding with the use of a mold having the recess/projection structure mentioned above.

Figure 9A:
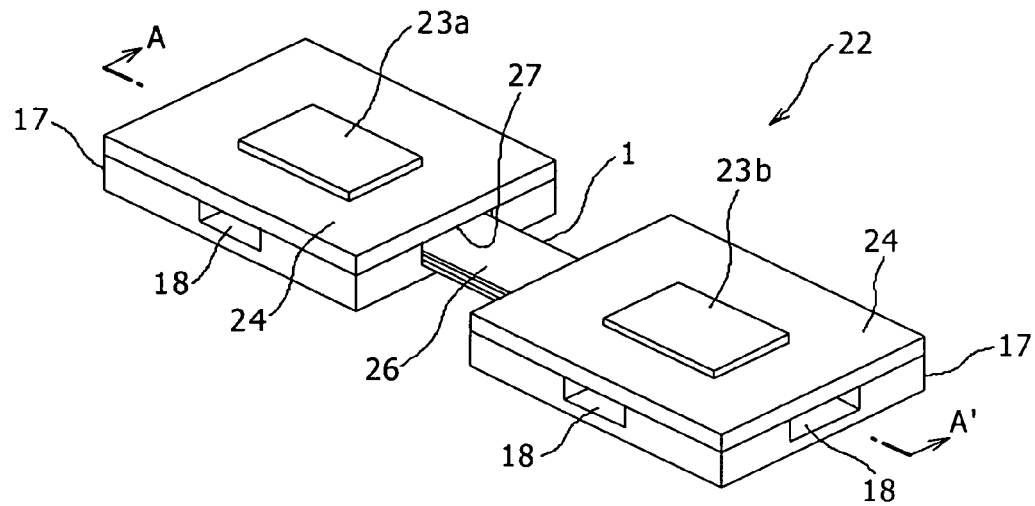
FIG. 9A is a schematic perspective view of an opto-electric composite device configured by setting an optical waveguide device according to the present invention in a pair of sockets each shown in FIGS. 8A and 8B.
Figure 9B:
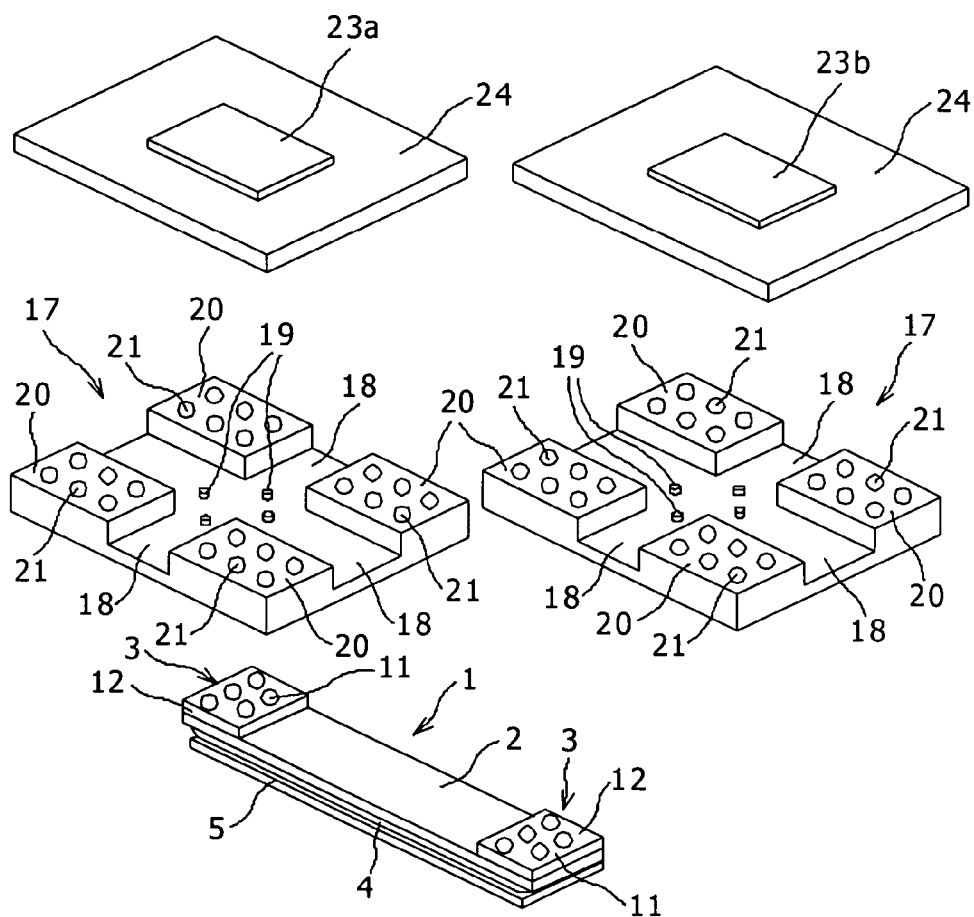
FIG. 9B is an exploded view of FIG. 9A.

FIG. 9A is a schematic perspective view of an opto-electric composite device 22 configured by setting the optical waveguide device 1 in a pair of sockets 17, and FIG. 9B is an exploded view of FIG. 9A.

As shown in FIGS. 9A and 9B, the opto-electric composite device 22 includes the pair of sockets 17 and the optical waveguide device 1 set in these sockets 17 so as to connect these sockets 17. The optical waveguide device 1 has any one of the structures mentioned in the previous preferred embodiments. The optical waveguide device 1 set in the sockets 17 is kept in noncontact with a printed wiring board to be hereinafter described, so that it is possible to effectively prevent breaking of the optical waveguide device 1 due to heat radiation from a semiconductor integrated circuit chip.

A pair of interposers 24 are fixed to the flat raised surfaces 20 of the pair of sockets 17, respectively. A pair of semiconductor integrated circuit chips 23a and 23b are mounted on the pair of interposers 24, respectively. Although not shown in FIGS. 9A and 9B, the light emitting devices and/or the light receiving devices as mentioned above are mounted on each interposer 24.

Figure 10A:
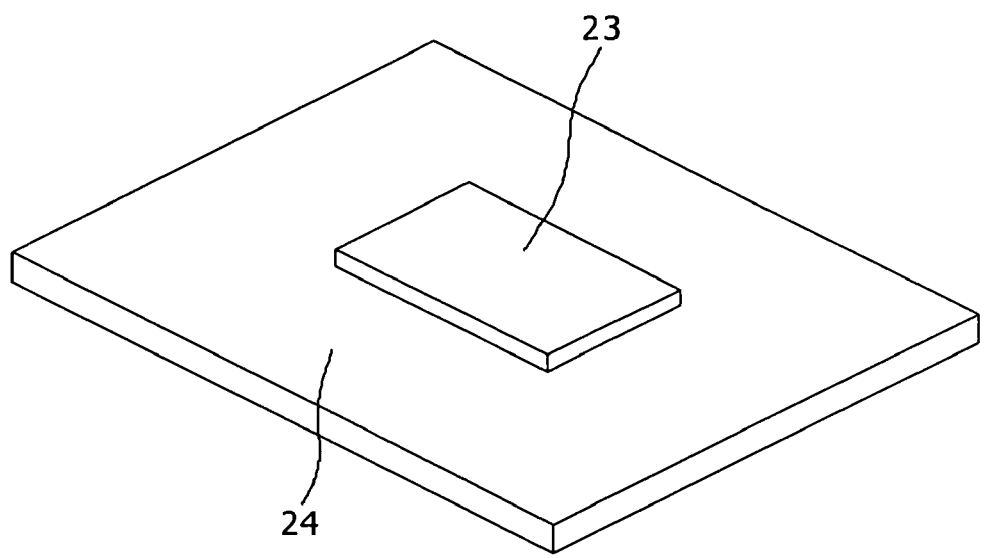
FIG. 10A is a schematic perspective view of an interposer included in the opto-electric composite device shown in FIGS. 9A and 9B as viewed from the upper side thereof.
Figure 10B:
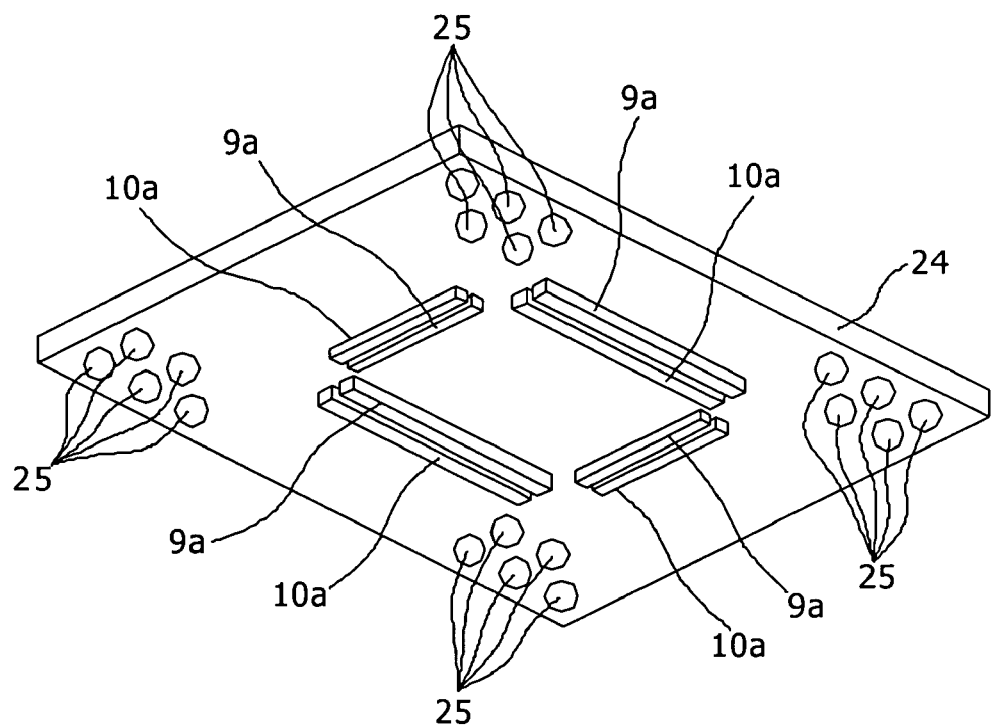
FIG. 10B is a schematic perspective view of the interposer as viewed from the lower side thereof.

FIG. 10A is a schematic perspective view of each interposer 24 as viewed from the upper side thereof, and FIG. 10B is a schematic perspective view of each interposer 24 as viewed from the lower side thereof. As shown in FIG. 10A, a semiconductor integrated circuit chip 23 is mounted on the upper surface of the interposer 24. As shown in FIG. 10B, a plurality of light emitting device arrays 9a each for launching light into the optical waveguide device 1 and a plurality of light receiving device arrays 10a each for receiving emergent light from the optical waveguide device 1 are mounted on the lower surface of the interposer 24 near the center thereof. Further, a plurality of electrodes 25 for other signal wiring (e.g., power supply wiring and DC signal) are provided on the lower surface of the interposer 24 near the periphery thereof. Although not shown in FIGS. 10A and 10B, each light emitting device array 9a includes a plurality of light emitting devices arranged at positions respectively corresponding to the light incident portions of the optical waveguide device 1, and each light receiving device array 10 includes a plurality of light receiving devices arranged at positions respectively corresponding to the light emergent portions of the optical waveguide device 1. Further, the gap in each light emitting device is provided with a through electrode for electrically connecting the light emitting device and the semiconductor integrated circuit chip, and the gap in each light receiving device is provided with a through electrode for electrically connecting the light receiving device and the semiconductor integrated circuit chip.

In fixing the pair of interposers 24 and the pair of sockets 17 with the optical waveguide device 1 fitted in the recesses 18, the lower surface of each interposer 24 on which the light emitting device arrays 9a and/or the light receiving device arrays 10a are mounted is brought into contact with the flat raised surfaces 20 of the corresponding socket 17, and the electrodes 25 of each interposer 24 are electrically connected to the terminal pins 21 of the corresponding socket 17.

As mentioned above, the depth of each recess 18 of each socket 17 is larger than the thickness of the optical waveguide device 1. Accordingly, as shown in FIG. 9A, a spacing 27 is defined between the upper surface 26 of the optical waveguide device 1 and the lower surface of each interposer 24 on which the light emitting device arrays 9a and/or the light receiving device arrays 10a are mounted.

As mentioned above, the semiconductor integrated circuit chip 23 is mounted on each socket 17 through each interposer 24, and the spacing 27 is defined between the upper surface 26 of the optical waveguide device 1 and the lower surface of each interposer 24 on which the light emitting device arrays 9a and/or the light receiving device arrays 10a are mounted. Accordingly, even when the semiconductor integrated circuit chip 23 generates heat in using the opto-electric composite device 22, it is possible to effectively prevent breaking of the optical waveguide device 1 due to the heat from the semiconductor integrated circuit chip 23.

In operation, an electrical signal transmitted from the semiconductor chip 23a is converted into an optical signal by each light emitting device of the light emitting device array 9a, and the optical signal as laser light is output from each light emitting device. The optical signal thus output is collimated by the corresponding lens portion 11 of the light collimating or a focusing section 3 located under the light emitting device array 9a, and then enters the light incident portion of the corresponding core 4. The incident light is guided in this core 4 in its longitudinal direction, and then emerges from the light emergent portion of this core 4. The optical signal thus output from the optical waveguide device 1 is received by the corresponding light receiving device of the light receiving device array 10a mounted on the other interposer 24 having the other semiconductor chip 23b. This optical signal is converted into an electrical signal by this light receiving device, and this electrical signal is then transmitted to the semiconductor chip 23b.

This opto-electric composite device 22 may be configured into an optical wiring system in which the optical waveguide device 1 according to the present invention is used as optical wiring. In this case, the opto-electric composite device 22 is fixed to a printed wiring board in the condition where electrical connection therebetween is established.

According to the opto-electric composite device 22, it can be electrically connected to a printed wiring board in the condition where the optical waveguide device 1 is fitted in the recesses 18 of the sockets 17. Accordingly, the mounting structure of an existing printed wiring board can be utilized in such a manner that an area for mounting the sockets 17 on the printed wiring board must be ensured and other general electrical wiring can be formed by a conventional process.

In the case that the optical waveguide device 1 is not resistant to a high-temperature process, the sockets 17 may be first fixed to the printed wiring board, and all of the mounting processes including a high-temperature process such as solder reflow and underfill resin sealing may be next completed. Thereafter, the optical waveguide device 1 may be fitted into the recesses 18 of the sockets 17 previously fixed to the printed wiring board. Thus, the optical waveguide device 1 can be mounted without suffering damage due to high temperature.

Further, each socket 17 can be formed of a resin having rigidity higher than that of the printed wiring board, and optical coupling between the optical devices and the optical waveguide device 1 can be established on this socket 17. Accordingly, a mounting accuracy required for the optical coupling can be easily ensured. For example, an assembly accuracy on the order of several micrometers can be ensured by an existing molding technique. Accordingly, a higher density in an optical bus can be expected.

Further, since the semiconductor integrated circuit chip 23 and the optical device arrays 9a and/or 10a are mounted on the opposite surfaces of the interposer 24 in close relationship, the wiring length between the semiconductor integrated circuit chip 23 and the optical devices can be reduced. Accordingly, measures against noise and crosstalk of electrical signals can be easily taken, and an optical modulation rate can also be improved.

Further, since the opto-electric composite device 22 can be electrically connected to the printed wiring board in the condition where the optical waveguide device 1 is fitted in the recesses 18 of the sockets 17, high-density wiring on the printed wiring board and the flexibility of design thereof can be ensured and an optical wiring system can be extended on the printed wiring board at a low cost with high flexibility. Accordingly, it is possible to expect high-speed distributed processing on the printed wiring board, high functionality of electronic equipment as a whole, and reduced TAT (turn around time) of development, for example.

A manufacturing method for the opto-electric composite device 22 will now be described with reference to FIGS. 11A to 13C. FIGS. 11A to 11C and FIGS. 12A and 12B are schematic sectional views taken along the line A-A' in FIG. 9A.

Figure 11A:
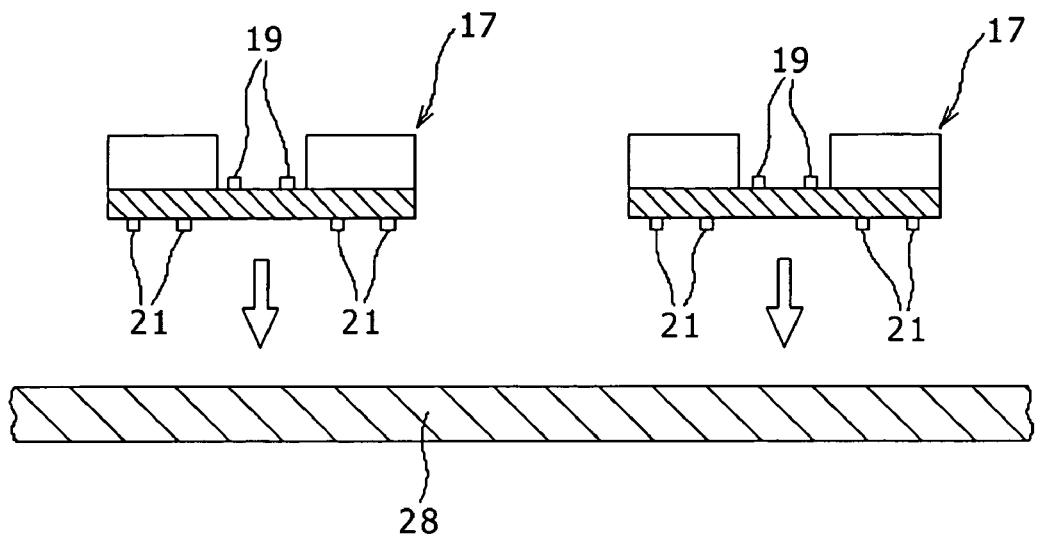
FIGS. 11A to 11C are schematic sectional views showing a manufacturing method for the opto-electric composite device shown in FIGS. 9A and 9B.
Figure 11B:
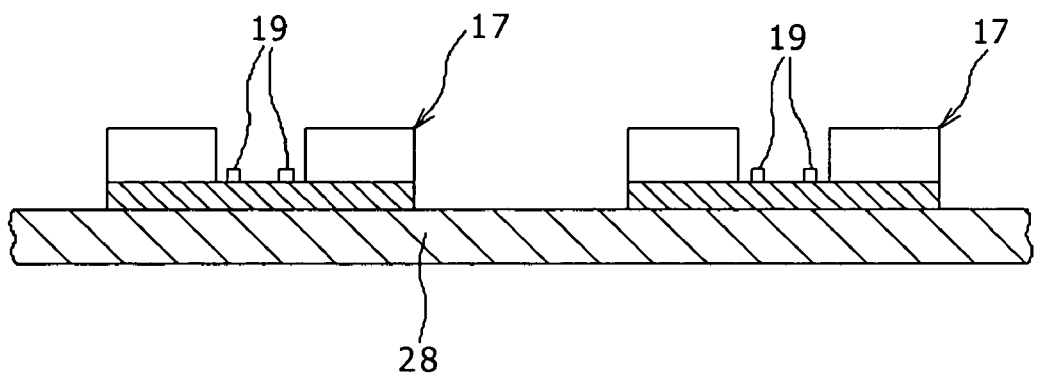

As shown in FIGS. 11A and 11B, a pair of sockets 17 are mounted on a printed wiring board 28. At this time, the terminal pins 21 of each socket 17 are aligned to electrodes (not shown) on the printed wiring board 28 and are electrically connected with each other.

Although not shown, other electronic components are preliminarily mounted on the printed wiring board 28, and electrical wiring is also preliminarily formed on the printed wiring board 28.

Figure 11C:
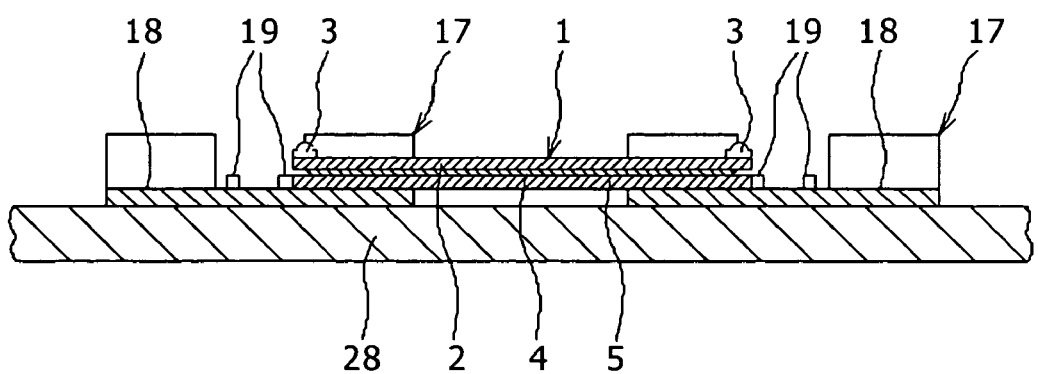

As shown in FIG. 11C, the optical waveguide device 1 is fitted at its opposite end portions into the opposed recesses 18 of the sockets 17 so as to connect the sockets 17. At this time, the optical waveguide device 1 can be easily positioned in its longitudinal direction by the opposed projections 19 of the sockets 17, and can be easily positioned in its transverse direction by the opposed recesses 18 of the sockets 17. Further, since the optical waveguide device 1 is fitted in the recesses 18 of the sockets 17, the optical waveguide device 1 is kept in noncontact with the printed wiring board 28.

Figure 13A:
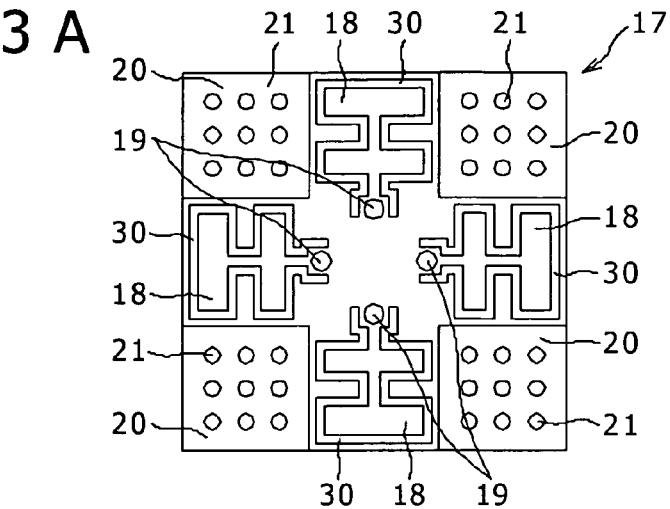
FIGS. 13A to 13C are schematic plan views showing a process of fixing the optical waveguide device to each socket in the manufacturing method shown in FIGS. 11A to 11C and FIGS. 12A and 12B.
Figure 13B:
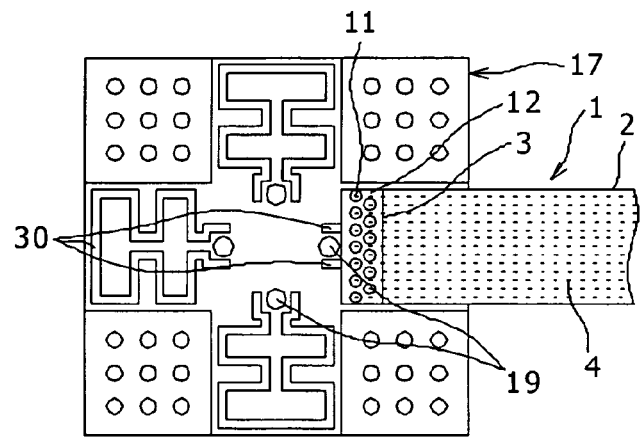
Figure 13C:
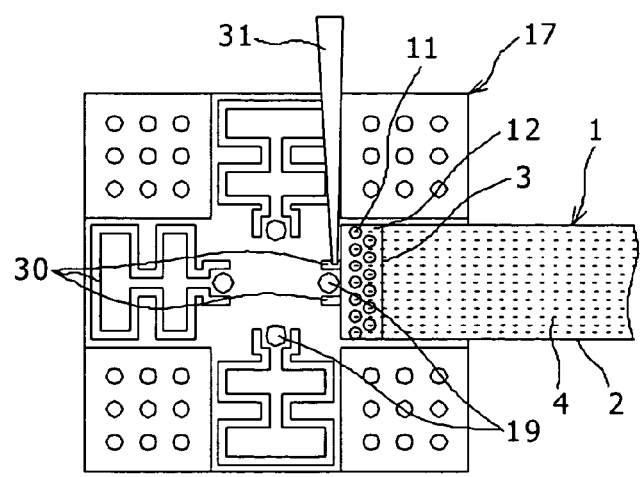

The optical waveguide device 1 may be fixed to the sockets 17 by any bonding means such as adhesive resin. FIGS. 13A to 13C show a process of fixing the optical waveguide device 1 to each socket 17 by using adhesive resin. As shown in FIG. 13A, a groove 30 having an arbitrary shape is formed on the bottom surface of each recess 18 of each socket 17. Both ends of the groove 30 are positioned near the corresponding projection 19. As shown in FIG. 13B, the optical waveguide device 1 is fitted into the recess 18 of each socket 17. As mentioned above, the optical waveguide device 1 can be easily positioned in its longitudinal and transverse directions by the projection 19 and the recess 18. In this condition, both ends of the groove 30 positioned near the projection 19 are not covered by the optical waveguide device 1. As shown in FIG. 13C, adhesive resin is filled into the groove 30 from its exposed both ends by using a dispenser 31 or the like, and is then cured to thereby fix the optical waveguide device 1 in the recess 18 of each socket 17.

After setting the optical waveguide device 1 in the sockets 17 as described above, the interposers 24 are fixed to the flat raised surfaces 20 of the sockets 17, respectively. Preliminarily mounted on the interposers 24 are the semiconductor integrated circuit chips 23a and 23b, e.g., MPU (micro processor unit) and DRAM (dynamic random access memory) and the light emitting device arrays 9a and/or the light receiving device arrays 10a. In fixing each interposer 24 to the corresponding socket 17, the lower surface of the interposer 24 on which the light emitting device arrays 9a and/or the light receiving device arrays 10a are mounted is brought into contact with the flat raised surfaces 20 of the socket 17, and the electrodes 25 formed on the lower surface of the interposer 24 are electrically connected to the terminal pins 21 (see FIG. 8A) exposed to the flat raised surfaces 20 of the socket 17.

Figure 12A:
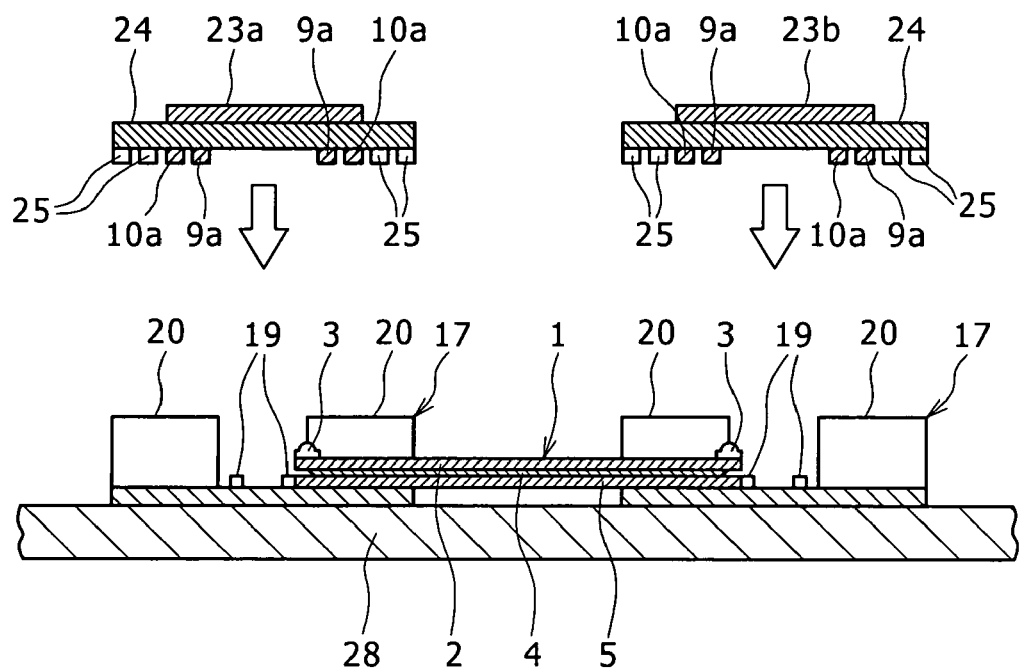
FIGS. 12A and 12B are schematic sectional views showing a manufacturing method for the opto-electric composite device shown in FIGS. 9A and 9B.
Figure 12B:
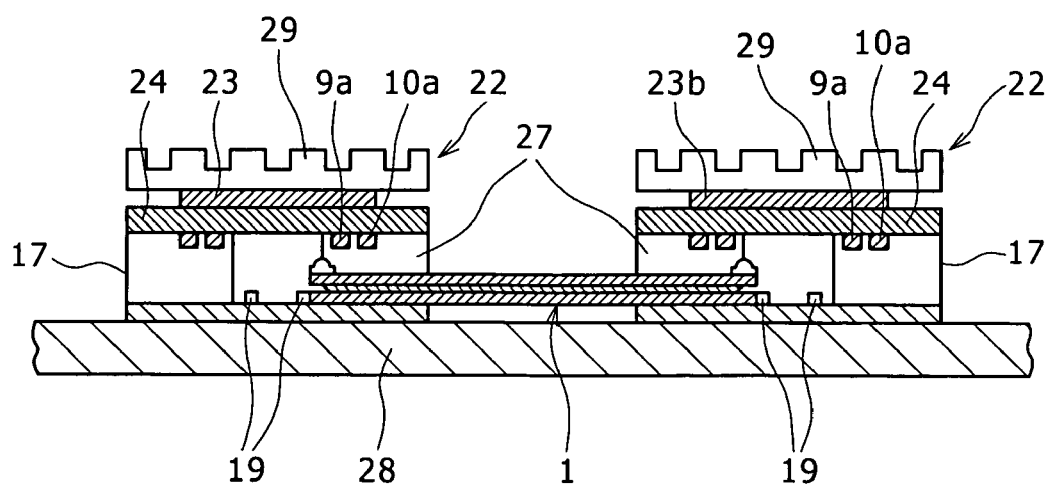

As shown in FIG. 12B, aluminum fins 29 are set on the semiconductor integrated circuit chips 23a and 23b, respectively.

By using this opto-electric composite device 22, an optical wiring system can be configured wherein the optical waveguide device 1 is used as optical wiring.

Figure 14A:
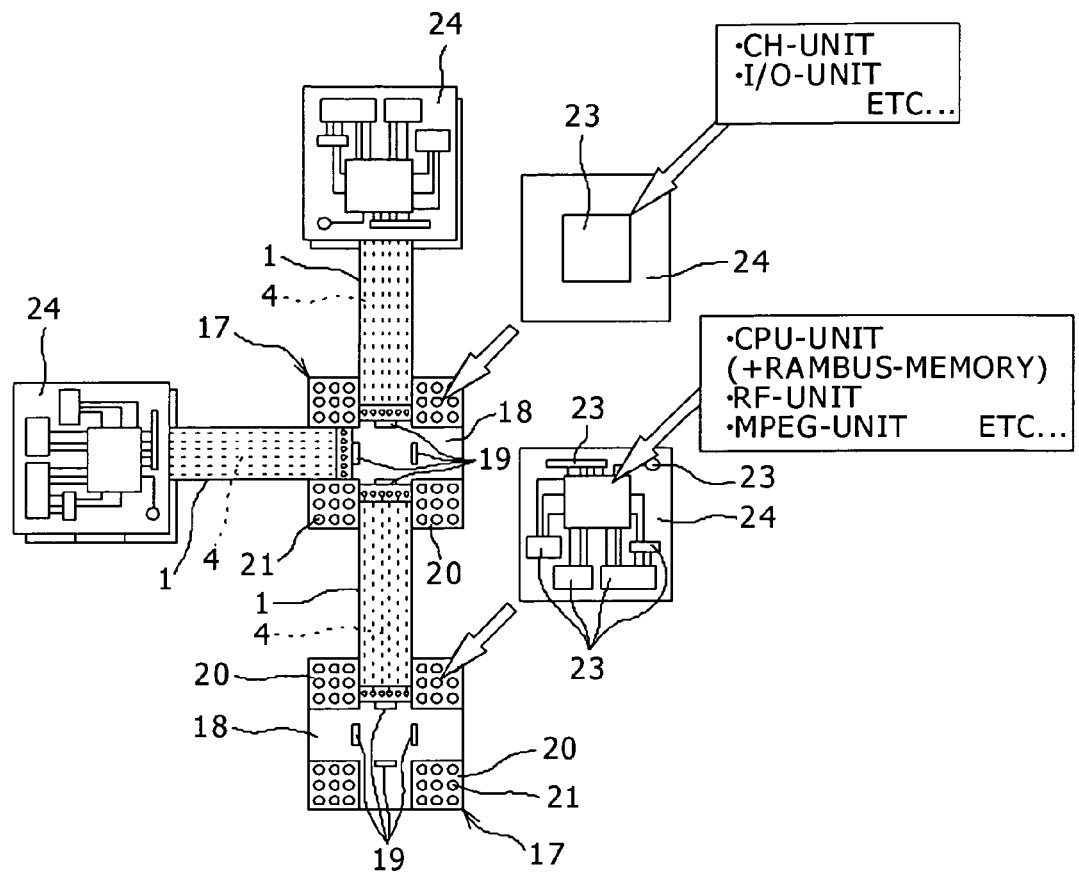
FIGS. 14A and 14B are schematic plan views showing an optical wiring system including the opto-electric composite device mounted on a printed wiring board.
Figure 14B:
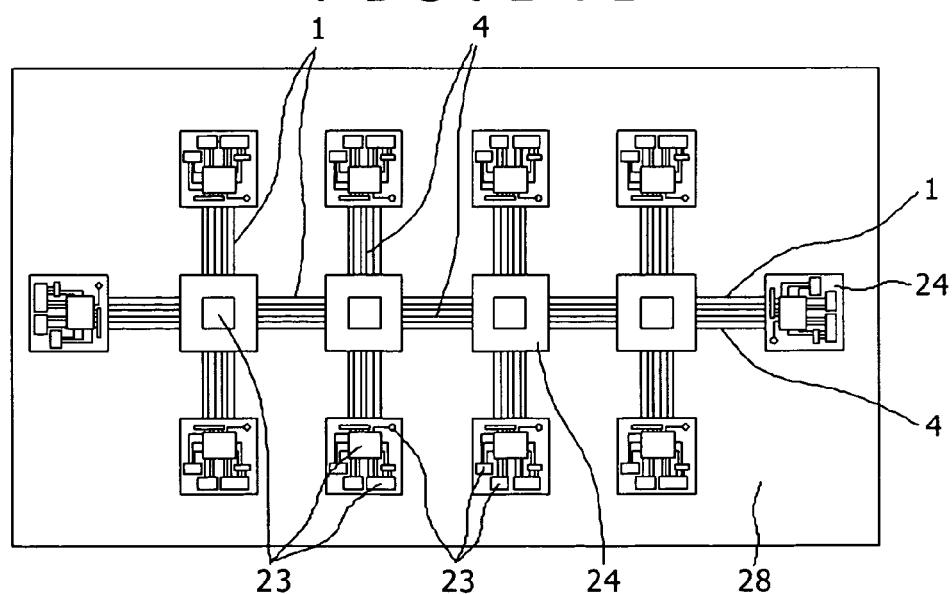

FIGS. 14A and 14B show an example of such an optical wiring system wherein the opto-electric composite device 22 is extended on the printed wiring board 28. For example, by normalizing an optical waveguide module, the extension in four directions can be flexibly attained. Further, in the optical waveguide device 1 according to the present invention, the cladding 2 is formed from a flexible sheet, and each light collimating or a focusing section 3 is formed as an integral member composed of the lens portions 11 and the lens supporting portion 12, wherein the lens supporting portion 12 is bonded to the cladding 2. Accordingly, the optical waveguide device 1 has high rigidity at its opposite end portions except the intermediate portion, so that the opto-electric composite device 22 can be extended not only on the printed wiring board 28, but also between a plurality of wiring boards. As a result, high-speed distributed processing on the printed wiring board 28 can be attained, and it is possible to expect high functionality of SET and reduced TAT of development, for example. In particular, since the cladding 2 is formed from a flexible sheet, the intermediate portion of the optical waveguide device 1 becomes flexible to thereby allow the absorption of mounting errors and deformation due to heat and external stress, for example. Accordingly, the effects as mentioned above can be realized more surely.

According to this preferred embodiment, the opto-electric composite device 22 can be electrically connected to the printed wiring board 28 in the condition where the optical waveguide device 1 is fitted in the recesses 18 of the sockets 17. Accordingly, the mounting structure of the existing printed wiring board 28 can be utilized in such a manner that an area for mounting the sockets 17 on the printed wiring board 28 must be ensured and other general electrical wiring can be formed by a conventional process.

In the case that the optical waveguide device 1 is not resistant to a high-temperature process, the sockets 17 may be first fixed to the printed wiring board 28, and all of the mounting processes including a high-temperature process such as solder reflow and underfill resin sealing may be next completed. Thereafter, the optical waveguide device 1 may be fitted into the recesses 18 of the sockets 17 previously fixed to the printed wiring board 28. Thus, the optical waveguide device 1 can be mounted without suffering damage due to high temperature.

Further, each socket 17 can be formed of a resin having rigidity higher than that of the printed wiring board 28, and optical coupling between the optical devices and the optical waveguide device 1 can be established on this socket 17. Accordingly, a mounting accuracy required for the optical coupling can be easily ensured. For example, an assembly accuracy on the order of several micrometers can be ensured by an existing molding technique. Accordingly, a higher density in an optical bus can be expected.

Further, since each of the semiconductor integrated circuit chips 23a and 23b and the optical device arrays 9a and/or 10a are mounted on the opposite surfaces of the corresponding interposer 24 in close relationship, the wiring length between each of the semiconductor integrated circuit chips 23a and 23b and the optical devices can be reduced. Accordingly, measures against noise and crosstalk of electrical signals can be easily taken, and an optical modulation rate can also be improved.

Further, since the opto-electric composite device 22 can be electrically connected to the printed wiring board 28 in the condition where the optical waveguide device 1 is fitted in the recesses 18 of the sockets 17, high-density wiring on the printed wiring board 28 and the flexibility of design thereof can be ensured and an optical wiring system can be extended on the printed wiring board 28 at a low cost with high flexibility. Accordingly, it is possible to expect high-speed distributed processing on the printed wiring board 28, high functionality of electronic equipment as a whole, and reduced TAT (turn around time) of development, for example.

Further, the semiconductor integrated circuit chips 23a and 23b are mounted on the sockets 17 through the interposers 24, and the spacing 27 is defined between the upper surface 26 of the optical waveguide device 1 and the lower surface of each interposer 24 on which the light emitting device arrays 9a and/or the light receiving device arrays 10a are mounted. Accordingly, even when the semiconductor integrated circuit chips 23a and 23b generate heat in using the opto-electric composite device 22, it is possible to effectively prevent breaking of the optical waveguide device 1 due to the heat from the semiconductor integrated circuit chips 23a and 23b.

Eighth Preferred Embodiment

The electronic equipment according to the present invention includes the optical information processing apparatus according to the present invention, a circuit device for supplying an input signal to the input side of the optical information processing apparatus, and a circuit device for receiving an output signal from the output side of the optical information processing apparatus, wherein the optical information processing apparatus includes the optical waveguide device according to the present invention, a light emitting device for launching light into the core of the optical waveguide device, and a light receiving device for receiving emergent light from the core.

Further, a converter for converting a parallel input signal into a serial input signal is preferably connected through a driver amplifier to the light emitting device, and a converter for converting a serial output signal into a parallel output signal is preferably connected through a transimpedance amplifier and an I/V conversion amplifier to the light receiving device.

Figure 15:
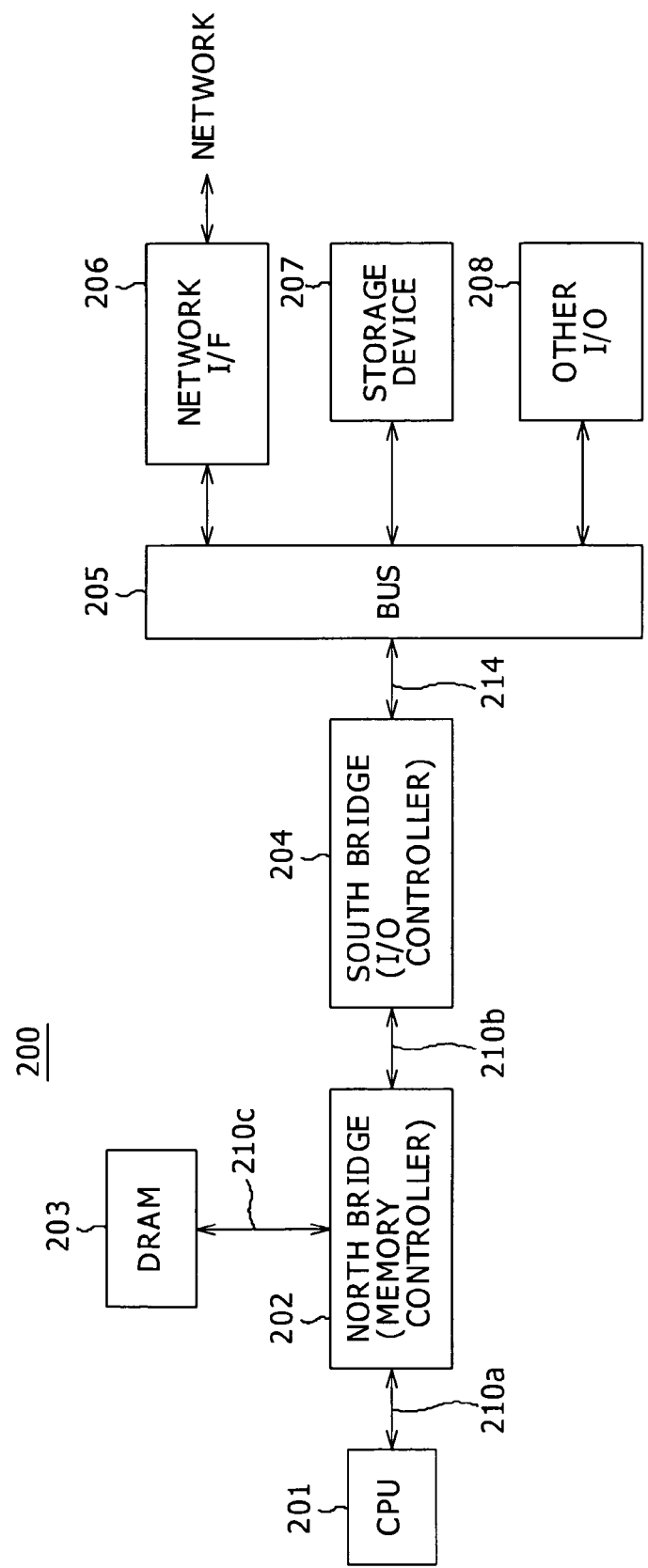
FIG. 15 is a block diagram showing electronic equipment according to an eighth preferred embodiment of the present invention.

FIG. 15 shows the configuration of a computer system 200 as an example of the electronic equipment according to the present invention. The computer system 200 includes a CPU (central processing unit) 201, north bridge 202 as a memory controller, DRAM (dynamic random access memory) 203, south bridge 204 as an I/O controller, bus 205, network interface (network I/F) 206, storage device 207, and other input/output devices (I/O devices) 208.

The north bridge 202 is connected to the CPU 201 through an optical information processing apparatus 210a configured as optical wiring according to the present invention. The south bridge 204 is connected to the north bridge 202 through an optical information processing apparatus 210b configured as optical wiring according to the present invention, and is further connected through the optical wiring 210a to the CPU 201. The DRAM 203 is connected to the north bridge 202 through an optical information processing apparatus 210c configured as optical wiring according to the present invention. The CPU 201 controls each component according to an OS (operating system) and an application program. The north bridge 202 centrally controls the access to the memory 203.

The bus 205 is connected through electrical wiring 214 to the south bridge 204. All of the network interface 206, the storage device 207, and the other I/O devices 208 are connected to the bus 205. The storage device 207 includes an HDD (hard disk drive), DVD (digital versatile disk) drive, and CD (compact disk) drive. The I/O devices 208 include a video input/output device and serial and parallel interfaces.

Figure 16:
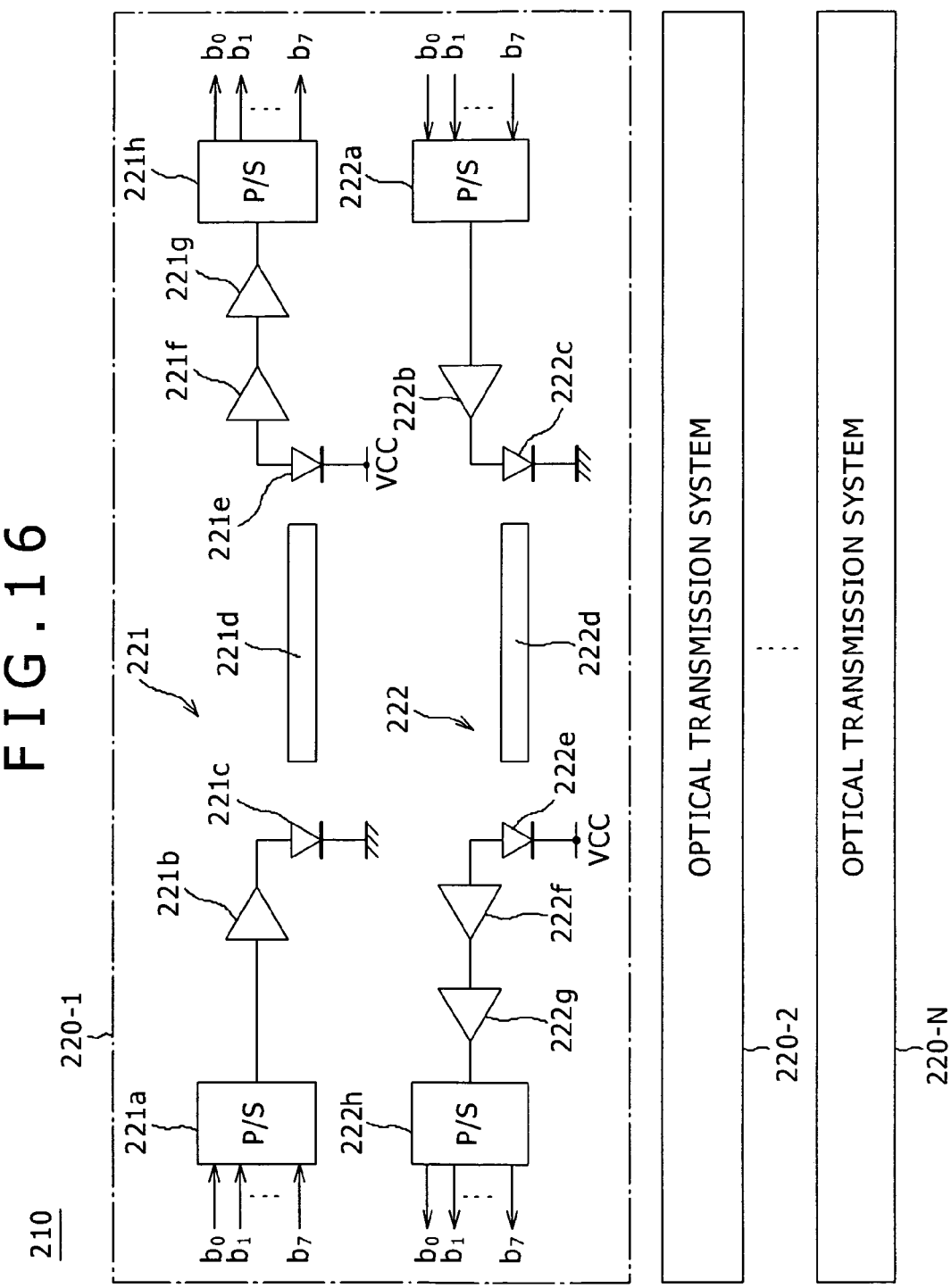
FIG. 16 is a block diagram showing the configuration of each optical information processing apparatus as optical wiring included in the electronic equipment shown in FIG. 15.

FIG. 16 shows the configuration of each of the optical information processing apparatuses 210a, 210b, and 210c shown in FIG. 15 (which devices 210a, 210b, and 210c are represented by optical wiring 210 in FIG. 16). This optical wiring 210 has a plurality of optical transmission systems 220-1 to 220-N corresponding to N channels. Each of the optical transmission systems 210-1 to 220-N is composed of a first transmission system 221 for transmitting an optical signal from a first circuit to a second circuit and a second transmission system 222 for transmitting an optical signal from the second circuit to the first circuit. In the case of the optical wiring 210a shown in FIG. 15, the first circuit corresponds to the CPU 201, and the second circuit corresponds to the north bridge 202. In the case of the optical wiring 210b shown in FIG. 15, the first circuit corresponds to the north bridge 202, and the second circuit corresponds to the south bridge 204. In the case of the optical wiring 210c shown in FIG. 15, the first circuit corresponds to the DRAM 203, and the second circuit corresponds to the north bridge 202. Further, the optical wiring 210 has a configuration having opposite waveguide directions as shown in FIGS. 6A to 6C.

The first transmission system 221 includes a parallel/serial converter (P/S converter) 221a, driver amplifier 221b, semiconductor laser 221c as the light emitting device, optical waveguide device 221d according to the present invention, photodiode 221e as the light receiving device, transimpedance amplifier (TIA) 221f, I/V conversion amplifier (IVA) 221g, and serial/parallel converter (S/P converter) 221h. In this case, the P/S converter 221a, the driver amplifier 221b, and the semiconductor laser 221c are provided in the first circuit, and the photodiode 221e, the ITA 221f, the IVA 221g, and the S/P converter 221h are provided in the second circuit. The optical waveguide device 221d has such a structure as described in the first preferred embodiment, and it is positioned so that an optical signal transmitted from the semiconductor laser 221c effectively enters the device 221d and an optical signal guided by the device 221d is effectively received by the photodiode 221e.

Similarly, the second transmission system 222 includes a P/S converter 222a, driver amplifier 222b, semiconductor laser 222c, optical waveguide device 222d according to the present invention, photodiode 222e, TIA 222f, IVA 222g, and S/P converter 222h. In this case, the P/S converter 222a, the driver amplifier 222b, and the semiconductor laser 222c are provided in the second circuit, and the photodiode 222e, the TIA 222f, the IVA 222g, and the S/P converter 222h are provided in the first circuit. The optical waveguide device 222d has such a structure as described in the first preferred embodiment, and it is positioned so that an optical signal transmitted from the semiconductor laser 222c effectively enters the device 222d and an optical signal guided by the device 222d is effectively received by the photodiode 222e.

Each of the P/S converters 221a and 222a converts parallel data to be transmitted, e.g., 8-bit parallel data of $b_0$ to $b_7$ 6into serial data. The driver amplifiers 221b and 222b drive the semiconductor lasers 221c and 222c according to the serial data obtained by the P/S converters 221a and 222a, respectively. The semiconductor lasers 221c and 222c generate optical signals corresponding to the serial data. The TIAs 221f and 222f establish impedance matching in supplying current signals generated by photoelectric conversion from the photodiodes 221e and 222e to the subsequent IVAs 221g and 222g, respectively. The IVAs 221g and 222g convert the current signals as output signals from the ITAs 221f and 222f into voltage signals, respectively. The S/P converters 221h and 222h convert the transmitted serial data as output signals from the IVAs 221g and 222g into parallel data.

There will now be described the operation in transmitting data from the first circuit to the second circuit. The 8-bit parallel data to be transmitted from the first circuit is converted into serial data by the P/S converter 221a, and this serial data is supplied to the driver amplifier 221b. The semiconductor laser 221c is driven by the driver amplifier 221b to generate an optical signal corresponding to the serial data. The optical signal is next guided by the optical waveguide device 221d and transmitted to the second circuit.

In the second circuit, the optical signal guided by the optical waveguide device 221d and emerging therefrom is received by the photodiode 221e. The optical signal is next converted into a current signal by the photodiode 221e, and this current signal is supplied through the TIA 221f for impedance matching to the IVA 221g, in which the current signal is converted into a voltage signal. The transmitted serial data as output signal from the IVA 221g is next converted into parallel data by the S/P converter 221h.

In this manner, data is transmitted from the first circuit to the second circuit. Although not described in detail, the operation in transmitting data from the second circuit to the first circuit is similarly performed. Since the optical wiring 210 shown in FIG. 16 has the N optical transmission systems 220-1 to 220-N corresponding to N channels, data transmission and reception corresponding to N channels can be performed in parallel.

In the computer system 200, semiconductor chips constituting the CPU 201, the north bridge 202, the DRAM 203, the south bridge 204, and the bus 205 as electronic components are mounted on a printed wiring board (motherboard) not shown, and the optical information processing apparatus 210 configured as optical wiring according to the present invention is also mounted on this printed wiring board.

According to this preferred embodiment, the optical information processing apparatus as optical wiring according to the present invention is used between the chips in the electronic equipment. Accordingly, high-speed and large-capacity signal exchange can be realized.

Each of the optical waveguide devices 221d and 222d in the optical wiring 210 has such a structure as shown in FIGS. 1A and 1B. That is, each light collimating or a focusing section 3 is formed as an integral member composed of the lens portion 11 and the lens supporting portion 12, and the lens supporting portion 12 of each means 3 is bonded to the cladding 2. Accordingly, each of the optical waveguide devices 221d and 222d (corresponding to the optical waveguide device 1 shown in FIGS. 1A and 1B) has high rigidity at the opposite ends of the cladding 2, so that a bonding strength between the optical waveguide devices 221d and 222d and the printed wiring board can be improved. As a result, stable incidence and emergence of light without optical axis deviation can be ensured.

Further, since the cladding 2 is formed from a flexible sheet, the optical waveguide devices 221d and 222d can be made thin and flexible at their central portions. Accordingly, the deformation of the optical waveguide devices 221d and 222d due to heat, external stress, etc. can be effectively absorbed without the application of stress to the cladding 2.

Further, each light collimating or a focusing section 3 as an integral member composed of the lens portion 11 and the lens supporting portion 12 can be fabricated by a general injection molding technique, and an inexpensive sheet material can be used for the flexible sheet as the material of the cladding 2 to thereby reduce the amount of use of an expensive optical resin, thus reducing the cost.

Thus, the optical waveguide device according to the present invention has such excellent effects as mentioned above, so that the electronic equipment using this optical waveguide device according to the present invention can exhibit an effect that stable incidence and emergence of light can be ensured without the influence of heat, external stress, etc. and the limitation of an installation environment.

Ninth Preferred Embodiment

Figure 17:
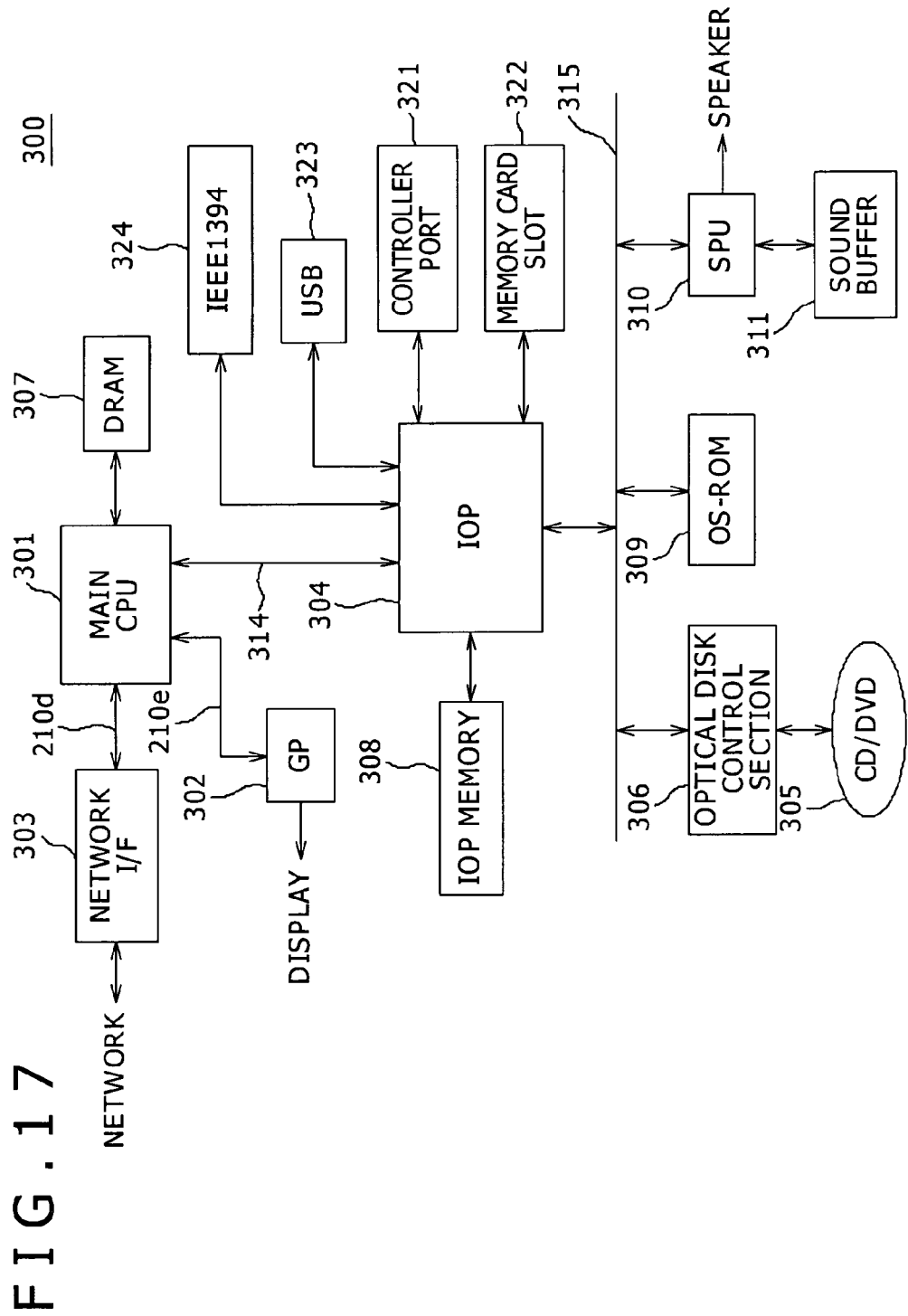
FIG. 17 is a block diagram showing electronic equipment according to a ninth preferred embodiment of the present invention.

FIG. 17 shows the configuration of a game machine 300 as another example of the electronic equipment according to the present invention. The game machine 300 basically includes a main CPU 301 for performing signal processing and control of internal components according to various application programs such as a game application program, a graphic processor (GP) 302 for performing image processing, a network interface (network I/F) 303 for interfacing with a network such as the Internet, an IO processor (IOP) 304 for performing interface processing, an optical disk control section 306 for performing read control of an optical disk 305 such as DVD and CD and decoding data read from the optical disk 305, a DRAM 307 as a main memory connected to the main CPU 301, an IOP memory 308 for holding instructions and data to the IO processor 304, an OS-ROM 309 in which a program for an operating system is mainly stored, a sound processor unit (SPU) 310 for performing sound signal processing, and a sound buffer 311 for storing compressed waveform data.

The main CPU 301 and the network I/F 303 are connected by optical wiring 210d. The main CPU 301 and the graphic processor 302 are connected by optical wiring 210e.

Each of the optical wirings 210d and 210e is configured as shown in FIG. 16, so that data transmission and reception by optical signals are performed between the main CPU 301 and the network I/F 303 and between the main CPU 301 and the graphic processor 302.

The main CPU 301 and the IO processor 304 are connected by an SBUS 314. The IO processor 304 is connected through an SSBUS 315 to the optical disk control section 306, the OS-ROM 309, and the second processor unit 310.

The main CPU 301 executes a program stored in the OS-ROM 309 or various game application programs read from the optical disk 305 and loaded into the DRAM 307 or downloaded through a communication network. The graphic processor 302 performs rendering or the like in a video game to output a video signal to a display, for example.

Connected to the IO processor 304 are a controller port 321 to which a controller (not shown) is connected, a memory card slot 322 into which a memory card (not shown) is inserted, a USB connection terminal 323, and an IEEE1394 connection terminal 324. Accordingly, the IO processor 304 performs data exchange, protocol conversion, etc. between it and the controller connected through the controller port 321, the memory card connected through the memory card slot 322, or a mobile phone or personal computer (both not shown) connected through the USB connection terminal 323.

The sound processor unit 310 reproduces compressed waveform data stored in the sound buffer 311 at a predetermined sampling frequency according to an instruction from the main CPU 301, thereby synthesizing various sounds to output an audio signal to a speaker.

In the game machine 300, semiconductor chips as basic electronic components including the main CPU 301 are mounted on a printed wiring board (motherboard) not shown, and the optical information processing apparatuses 210d and 210e configured as optical wirings according to the present invention are also mounted on this printed wiring board.

According to this preferred embodiment, the optical information processing apparatus as optical wiring according to the present invention is used between the chips in the electronic equipment. Accordingly, high-speed and large-capacity signal exchange can be realized.

Further, the optical waveguide device according to the present invention used in each of the optical wirings 210d and 210e has excellent effects similar to those of the eighth preferred embodiment, so that the electronic equipment using this optical waveguide device according to the present invention can exhibit a similar effect that stable incidence and emergence of light can be ensured without the influence of heat, external stress, etc. and the limitation of an installation environment.

Tenth Preferred Embodiment

Figure 18:
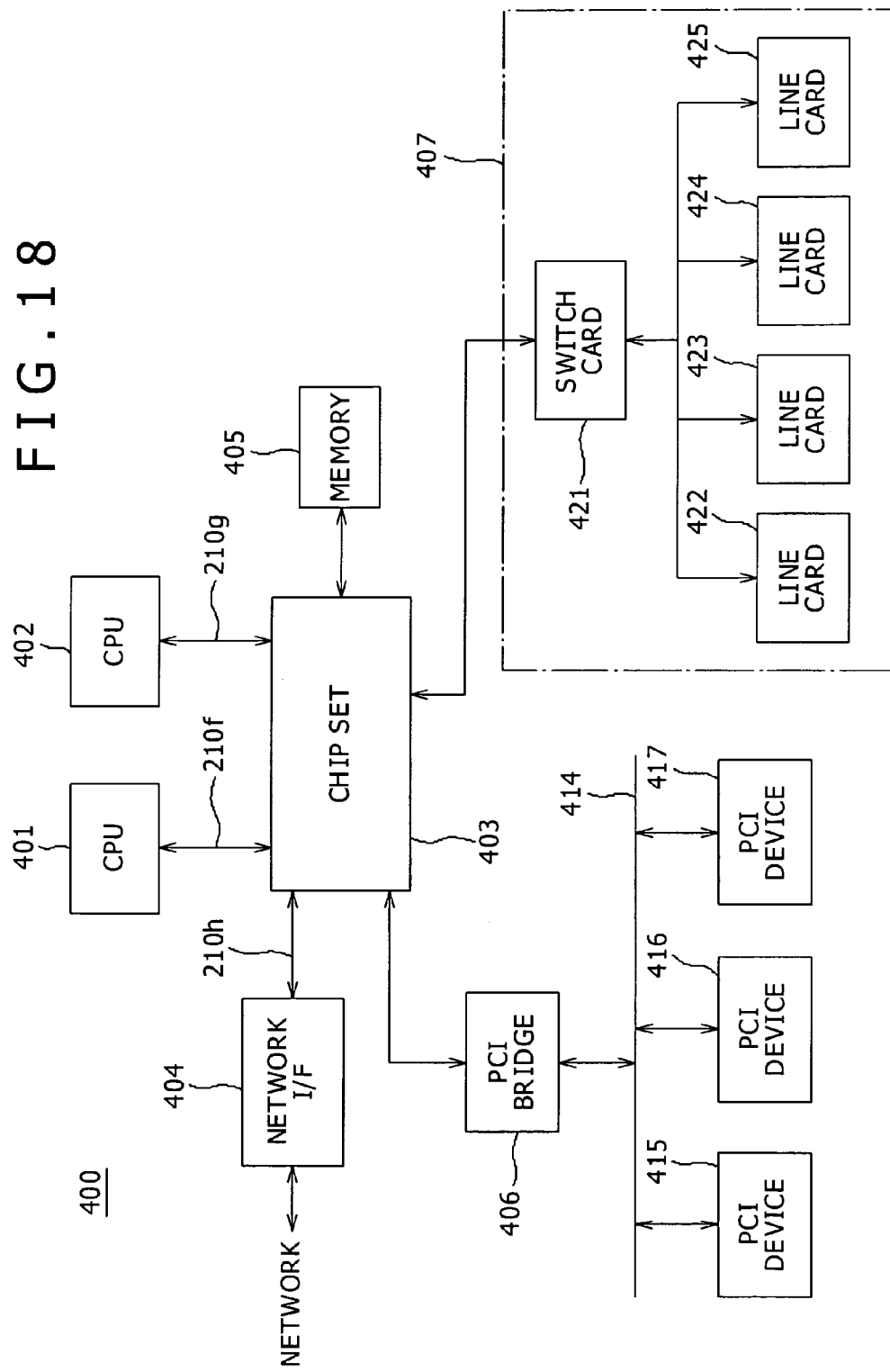
FIG. 18 is a block diagram showing electronic equipment according to a tenth preferred embodiment of the present invention.

FIG. 18 shows the configuration of a server 400 as another example of the electronic equipment according to the present invention. The server 400 basically includes CPUs 401 and 402, chip set 403, network interface (network I/F) 404, memory 405, PCI bridge 406, and router 407.

The CPUs 401 and 402 are respectively connected through optical wirings 210f and 210g to the chip set 403, and the network I/F 404 is connected through optical wiring 210h to the chip set 403. The network I/F 404 functions to interface with a network. The chip set 403 controls the CPUs 401 and 402, the network I/F 404, the memory 405, and the PCI bridge 406.

Each of the optical wirings 210f, 210g, and 210h is configured as shown in FIG. 16, so that data transmission and reception by optical signals are performed between the CPU 401 and the chip set 403, between the CPU 402 and the chip set 403, and between the chip set 403 and the network I/F 404.

The memory 405, the PCI bridge 406, and the router 407 are connected through electrical wirings to the chip set 403.

A plurality of PCI devices 415 to 417 such as storage devices are connected through a PCI bus 414 to the PCI bridge 406. The router 407 is composed of a switch card 421 and line cards 422 to 425, for example. The line cards 422 to 425 are processors for performing preprocessing of packets, and the switch card 421 is a switch for switching a destination of each packet according to an address.

In the server 400, semiconductor chips as basic electronic components including the CPUs 401 and 402 and the chip set 403 are mounted on a printed wiring board (motherboard) not shown, and the optical information processing apparatuses 210$f$, 210$g$, and 210$h$ configured as optical wirings according to the present invention are also mounted on this printed wiring board.

According to this preferred embodiment, the optical information processing apparatus as optical wiring according to the present invention is used between the chips in the electronic component. Accordingly, high-speed and large-capacity signal exchange can be realized.

Further, the optical waveguide device according to the present invention used in each of the optical wirings 210$f$, 210$g$, and 210$h$ has excellent effects similar to those of the eighth preferred embodiment, so that the electronic equipment using this optical waveguide device according to the present invention can exhibit a similar effect that stable incidence and emergence of light can be ensured without the influence of heat, external stress, etc. and the limitation of an installation environment.

While the specific preferred embodiments of the present invention have been described above, various modifications may be made without departing from the scope of the present invention.

In the first preferred embodiment shown in FIGS. 1A and 1B, the second cladding 5 is provided on the lower surface of the core 4 opposite to its upper surface where the lens portion 11 is bonded. As a modification, the second cladding 5 may be omitted.

As the lens portion 11, a convex lens is applicable. However, the shape of the lens portion in the present invention is not especially limited. For example, a spherical lens, cylindrical lens, etc. are also applicable.

Figure 19:
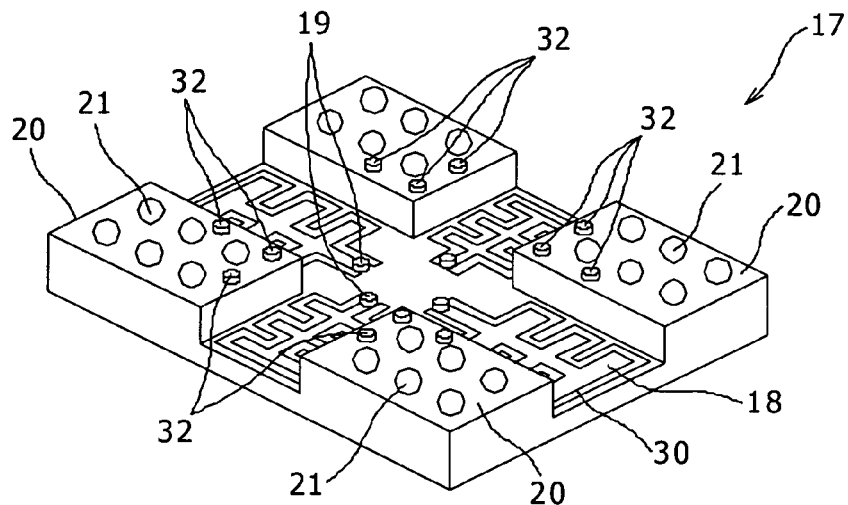
FIG. 19 is a schematic perspective view showing a modification of the socket shown in FIGS. 8A and 8B.
Figure 20:
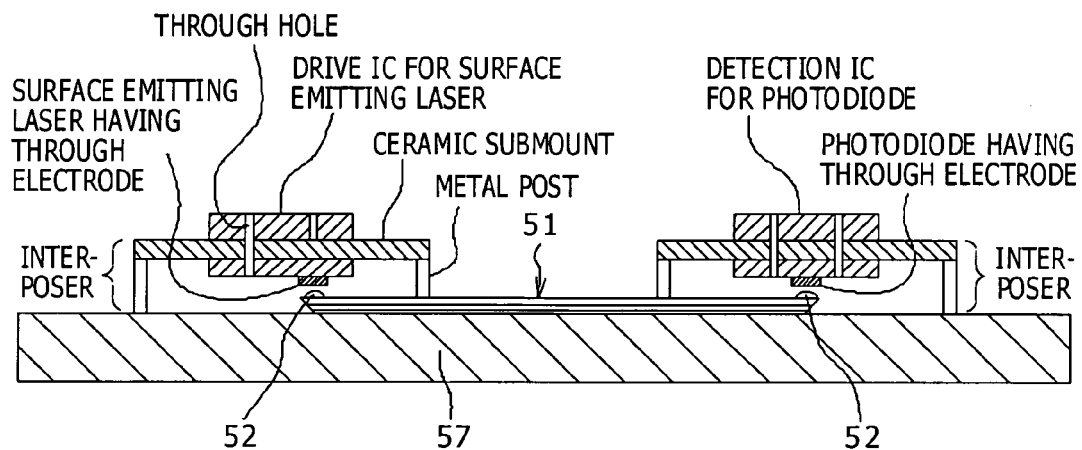
FIG. 20 is a schematic sectional view showing a mounting structure of an optical waveguide in the prior art.
Figure 21:
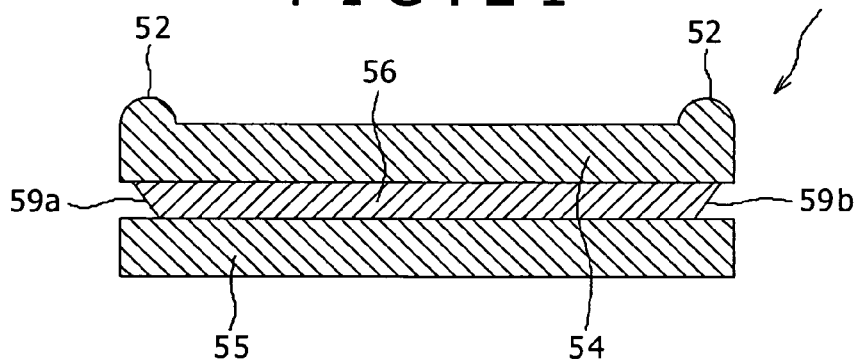
FIG. 21 is a schematic sectional view of the optical waveguide device shown in FIG. 20.
Figure 22A:
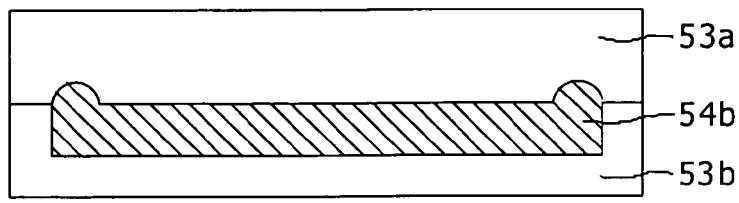
FIGS. 22A to 22F are schematic sectional views showing a manufacturing method for the optical waveguide shown in FIG. 21.
Figure 22B:
Figure 22C:
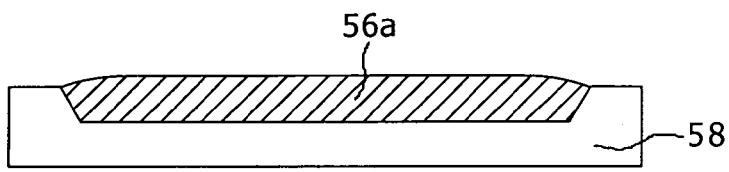
Figure 22D:
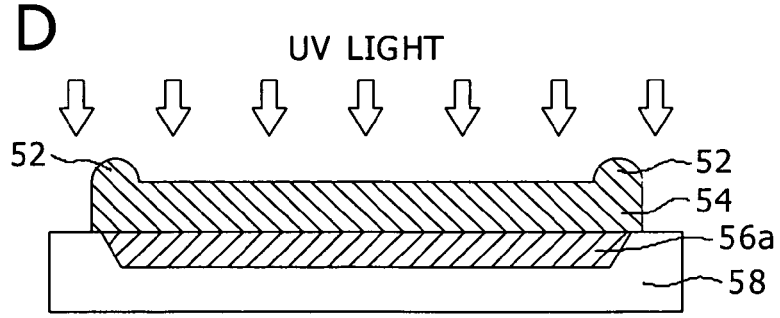
Figure 22E:
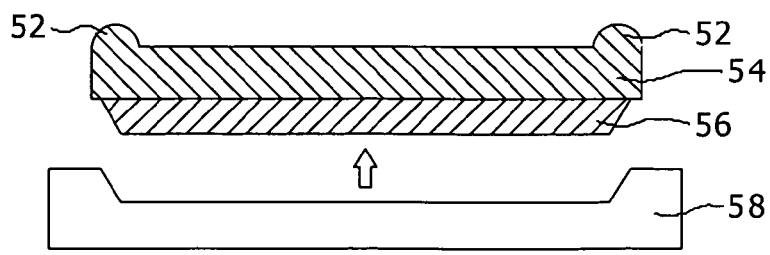
Figure 22F:
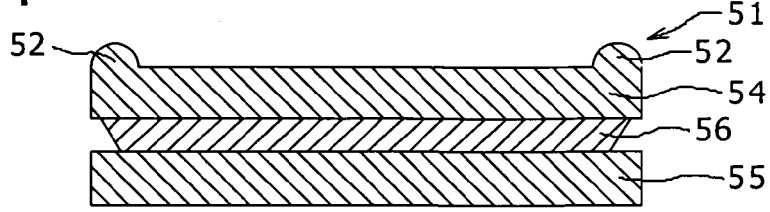

Further, as shown in FIG. 19, each flat raised surface 20 of the socket 17 may have a plurality of interposer positioning mechanisms 32 (e.g., fitting bosses). The shape, size, etc. of each positioning mechanism 32 are not especially limited. Further, the shape, size, etc. of each projection 19 are also not especially limited.

While the present invention is suitable for an optical wiring system for transmitting an optical signal carried by laser light as described above, the present invention is applicable also to a display by selecting a light source or the like.

The present invention can be suitably used as an optical information processing apparatus such as optical wiring configured so that signal light efficiently focused into a given flux by an optical waveguide device and then emerging from the optical waveguide device or signal light efficiently incident on the optical waveguide device and then emerging therefrom is received by a light receiving device (e.g., optical wiring or photodetector) located on the output side of the optical waveguide device.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An optical waveguide device comprising:
   a cladding having first and second surfaces opposite to each other;
   a plurality of cores arranged in parallel and laminated to said first surface of said cladding for guiding light in a longitudinal direction thereof, each of said plurality of cores having a pair of light incident and emergent portions at the corresponding opposite ends; and
   a plurality of lens portions, each pair of said plurality of lens portions corresponding to one of said plurality of cores, bonded to said second surface of said cladding at the opposite ends corresponding to said light incident and emergent portions of each of said plurality of cores,
   wherein,
   said cladding is formed of a material having a refractive index that is lower than that of said core,
   said plurality of cores are arranged into a plurality of groups, and
   each group includes a number of cores shifted at a given pitch along the longitudinal direction relatively to corresponding adjacent cores.

2. The optical waveguide device according to claim 1, wherein said cladding is formed from a flexible sheet, and each of said lens portions is bonded through a lens supporting portion to said second surface of said cladding.

3. The optical waveguide device according to claim 1, further comprising an additional cladding provided on said core opposite to said cladding.

4. The optical waveguide device according to claim 3, wherein said additional cladding is formed from a flexible sheet.

5. The optical information processing apparatus comprising:
   an optical waveguide device comprising (a) a cladding having first and second surfaces opposite to each other, (b) a plurality of cores arranged in parallel and laminated to said first surface of said cladding for guiding light in a longitudinal direction thereof, each of said plurality of cores having a pair of light incident and emergent portions at the corresponding opposite ends, and (c) a plurality of lens portions, each pair of said plurality of lens portions corresponding to one of said plurality of cores, bonded to said second surface of said cladding at the opposite ends corresponding to said light incident and emergent portions of each of said plurality of cores, said plurality of cores are arranged into a plurality of groups, each group includes a number of cores shifted at a given pitch along the longitudinal direction relatively to corresponding adjacent cores;
   a light emitting device for launching light into said optical waveguide device; and
   a light receiving device for receiving emergent light from said optical waveguide device,
   wherein,
   the light from said light emitting device enters said light incident portions of said plurality of cores through corresponding lens portions, and
   the emergent light from said optical waveguide device emerges from said light emergent portions of said plurality of cores and passing through the other corresponding lens portions to reach said light receiving device.

6. The optical information processing apparatus according to claim 5, further comprising:
a first converter connected through a driver amplifier to said light emitting device for converting a parallel input signal into a serial input signal; and
a second converter connected through a transimpedance amplifier and an I/V conversion amplifier to said light receiving device for converting a serial output signal into a parallel output signal.

7. The optical information processing apparatus according to claim 5, wherein said cladding is formed from a flexible sheet, and each of said lens portions is bonded through a lens supporting portion to said second surface of said cladding.

8. The optical information processing apparatus according to claim 5, wherein said optical waveguide device further comprises an additional cladding provided on said plurality of cores opposite to said cladding.

9. The optical information processing apparatus according to claim 8, wherein said additional cladding is formed from a flexible sheet.

10. A manufacturing method for an optical waveguide device comprising a cladding having first and second surfaces opposite to each other, (b) a plurality of cores arranged in parallel and laminated to said first surface of said cladding for guiding light in a longitudinal direction thereof, each of said plurality of cores having a pair of light incident and emergent portions at the corresponding opposite ends, and (c) a plurality of lens portions, each pair of said plurality of lens portions corresponding to one of said plurality of cores, bonded to said second surface of said cladding at the opposite ends corresponding to said light incident and emergent portions of each of said plurality of cores, said cladding is formed of a material having a refractive index that is lower than that of said core; said manufacturing method comprising the steps of:
arranging said plurality of cores into a plurality of groups, such that each group includes a number of cores shifted at a given pitch along the longitudinal direction relatively to corresponding adjacent cores;
forming said plurality of lens portions;
bonding said plurality of lens portions to said cladding; and
bonding said plurality of cores and said cladding.

11. The manufacturing method according to claim 10, wherein said lens portions are bonded to said second surface of said cladding, and said plurality of cores are next bonded to said first surface of said cladding in the condition where said light incident and emergent portions of said plurality of cores are respectively aligned to said plurality of lens portions.

12. The manufacturing method according to claim 10, wherein said plurality of cores is bonded to said first surface of said cladding, and said lens portions are next bonded to said second surface of said cladding at positions respectively corresponding to said light incident and emergent portions of said plurality of cores.

13. The manufacturing method according to claim 10, wherein said cladding is formed from a flexible sheet, and each of said lens portions is bonded through a lens supporting portion to said second surface of said cladding.

14. The manufacturing method according to claim 10, further comprising the step of providing additional cladding on said plurality of cores opposite to said cladding.

15. The manufacturing method according to claim 14, wherein said additional cladding is formed from a flexible sheet.

16. Electronic equipment comprising:
an optical information processing apparatus comprising (a) an optical waveguide device, (b) a light emitting device for launching light into said optical waveguide device, and (c) a light receiving device for receiving emergent light from said optical waveguide device;
a first circuit device provided on the input side of said optical information processing apparatus for supplying an input signal; and
a second circuit device provided on the output side of said optical information processing apparatus for receiving an output signal,
wherein,
said optical waveguide device comprising (a) a cladding having first and second surfaces opposite to each other, (b) a plurality of cores arranged in parallel and laminated to said first surface of said cladding for guiding light in a longitudinal direction thereof, each of said plurality of cores having a pair of light incident and emergent portions at the corresponding opposite ends, and (c) a plurality of lens portions, each pair of said plurality of lens portions corresponding to one of said plurality of cores, bonded to said second surface of said cladding at the opposite ends corresponding to said light incident and emergent portions of each of said plurality of cores, said plurality of cores are arranged into a plurality of groups, each group includes a number of cores shifted at a given pitch along the longitudinal direction relatively to corresponding adjacent cores,
the light from said light emitting device enters said light incident portions of said plurality of cores through corresponding lens portions, and
the emergent light from said optical waveguide device emerges from said light emergent portions of said plurality of cores and passing through the other corresponding lens portions to reach said light receiving device.

17. The electronic equipment according to claim 16, wherein said optical information processing apparatus further comprises:
a first converter connected through a driver amplifier to said light emitting device for converting a parallel input signal into a serial input signal; and
a second converter connected through a transimpedance amplifier and an I/V conversion amplifier to said light receiving device for converting a serial output signal into a parallel output signal.

18. The electronic equipment according to claim 16, wherein said cladding is formed from a flexible sheet, and each of said lens portions is bonded through a lens supporting portion to said second surface of said cladding.

19. The electronic equipment according to claim 16, wherein said optical waveguide device further comprises an additional cladding provided on said plurality of cores opposite to said cladding.

20. The electronic equipment according to claim 19, wherein said additional cladding is formed from a flexible sheet.

* * * * *